US012705468B2

(12) United States Patent
Badaroglu et al.

(10) Patent No.: US 12,705,468 B2
(45) Date of Patent: Aug. 11, 2026

(54) HYBRID MACHINE LEARNING ARCHITECTURE WITH NEURAL PROCESSING UNIT AND COMPUTE-IN-MEMORY PROCESSING ELEMENTS

(71) Applicant: QUALCOMM Incorporated, San Diego, CA (US)

(72) Inventors: Mustafa Badaroglu, Leuven (BE); Zhongze Wang, San Diego, CA (US); Titash Rakshit, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 892 days.

(21) Appl. No.: 17/813,834

(22) Filed: Jul. 20, 2022

(65) Prior Publication Data

US 2023/0025068 A1 Jan. 26, 2023

Related U.S. Application Data

(60) Provisional application No. 63/224,155, filed on Jul. 21, 2021.

(51) Int. Cl.
*G06N 3/04* (2023.01)
*G06F 15/80* (2006.01)
(Continued)

(52) U.S. Cl.
CPC ............. *G06N 3/063* (2013.01); *G06F 15/80* (2013.01); *G06N 3/04* (2013.01)

(58) Field of Classification Search
CPC .......... G06N 3/063; G06N 3/04; G06N 3/042; G06N 3/0464; G06N 3/048; G06N 3/045; G06F 15/80; G06F 15/7821; Y02D 10/00
See application file for complete search history.

(56) References Cited

U.S. PATENT DOCUMENTS 10,725,946 B1 * 7/2020 Berke ................. G06F 13/4022
10,839,894 B2 11/2020 Chen et al.
(Continued)

OTHER PUBLICATIONS

Chih, Y-D., et al., “16.4 An 89TOPS/W and 16.3TOPS/mm2 All-Digital SRAM-Based Full-Precision Compute-In Memory Macro in 22nm for Machine-Learning Edge Applications”, 2021 IEEE International Solid-State Circuits Conference (ISSCC), Session 16, Computation in Memory, Feb. 17, 2021, 3 pages.
(Continued)

*Primary Examiner* — Brandon S Cole

(74) *Attorney, Agent, or Firm* — Patterson + Sheridan LLP

(57) ABSTRACT

Methods and apparatus for performing machine learning tasks, and in particular, a hybrid architecture that includes both neural processing unit (NPU) and compute-in-memory (CIM) elements. One example neural-network-processing circuit generally includes a plurality of CIM processing elements (PEs), a plurality of neural processing unit (NPU) PEs, and a bus coupled to the plurality of CIM PEs and to the plurality of NPU PEs. One example method for neural network processing generally includes processing data in a neural-network-processing circuit comprising a plurality of CIM PEs, a plurality of NPU PEs, and a bus coupled to the plurality of CIM PEs and to the plurality of NPU PEs; and transferring the processed data between at least one of the plurality of CIM PEs and at least one of the plurality of NPU PEs via the bus.

9 Claims, 15 Drawing Sheets

(51) Int. Cl.
*G06N 3/048* (2023.01)
*G06N 3/063* (2023.01)

(56) References Cited

U.S. PATENT DOCUMENTS

| | | | | |
|---|---|---|---|---|
| 2013/0107872 | A1* | 5/2013 | Lovett | H04L 49/118 370/352 |
| 2018/0315473 | A1* | 11/2018 | Yu | G11C 11/54 |
| 2019/0042199 | A1* | 2/2019 | Sumbul | G11C 8/10 |
| 2019/0042949 | A1* | 2/2019 | Young | G06N 3/10 |
| 2019/0102170 | A1* | 4/2019 | Chen | G11C 7/16 |
| 2019/0281587 | A1* | 9/2019 | Zhang | H04W 72/23 |
| 2021/0005230 | A1* | 1/2021 | Wang | G11C 11/412 |
| 2021/0073619 | A1* | 3/2021 | Wang | G06N 3/065 |
| 2021/0073650 | A1* | 3/2021 | Reisser | G06N 3/065 |
| 2021/0089865 | A1 | 3/2021 | Wang et al. | |
| 2022/0351032 | A1* | 11/2022 | Chou | G11C 5/02 |

OTHER PUBLICATIONS

Kang M., et al., "Deep In-Memory Architectures in SRAM: An Analog Approach to Approximate Computing", Proceedings of the IEEE, vol. 108, No. 12, Dec. 2020, DOI: 10.1109/JPROC.2020.3034117, pp. 2251-2275.

International Search Report and Written Opinion—PCT/US2022/073979—ISA/EPO—Nov. 24, 2022.

Zhou K., et al., "Domino: A Tailored Network-on-Chip Architecture to Enable Highly Localized Inter- and Intra-Memory DNN Computing", arxiv.org, Cornell University Library, 201 OLIN Library Cornell University Ithaca, NY 14853, Jul. 18, 2021, XP091014302, Sections 2, 4, 6 and 7.1.1, figure 1, table 3, pp. 1-13.

Zhou K., et al., "Domino: A Tailored Network-on-Chip Architecture to Enable Highly Localized Inter-and Intra-Memory DNN Computing", ArXiv:2107.09500v1 [cs.AR], Jul. 18, 2021, pp. 1-13.

* cited by examiner

800

| Input/Depth/Kernel 0: Light, 1: Heavy | DCIM TOPS | NPU TOPS |
|---|---|---|
| 000 | Worse - Low Utilization | **Better** |
| 001 | **Better** - More Kernel Parallelism | Worse |
| 010 | **Better** if Depth Fits 32 Rows | Same |
| 011 | Worse - Repetitive Weight Update | **Better** - But Energy Penalty |
| 100 | Worse - Less Input Parallelism | **Better** |
| 101 | Same - More Kernel Parallelism | Same - Balanced Input and Kernel Parallelism |
| 110 | **Better** | Worse - Repetitive Weight Update |
| 111 | **Better** | Worse - Repetitive Weight Update |

*FIG. 8*

HYBRID MACHINE LEARNING ARCHITECTURE WITH NEURAL PROCESSING UNIT AND COMPUTE-IN-MEMORY PROCESSING ELEMENTS

CLAIM OF PRIORITY UNDER 35 U.S.C. § 119

This application claims the benefit of priority to U.S. Provisional Application No. 63/224,155, filed Jul. 21, 2021, which is expressly incorporated by reference herein in its entirety as if fully set forth below and for all applicable purposes.

TECHNICAL FIELD

Aspects of the present disclosure relate to machine learning, and in particular, to neural processing unit (NPU) and compute-in-memory (CIM) technologies.

BACKGROUND

Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

As the use of machine learning has proliferated for enabling various machine learning (or artificial intelligence) tasks, the desire for more efficient processing of machine learning model data has grown. In some cases, dedicated hardware, such as machine learning accelerators, may be used to enhance a processing system's capacity to process machine learning model data. However, such hardware demands space and power, which is not always available on the processing device. For example, "edge processing" devices, such as mobile devices, always-on devices, Internet of Things (IoT) devices, and the like, typically have to balance processing capabilities with power and packaging constraints. Further, accelerators may move data across common data busses, which can cause significant power usage and introduce latency into other processes sharing the data bus. Consequently, other aspects of a processing system are being considered for processing machine learning model data.

Memory devices are one example of another aspect of a processing system that may be leveraged for performing processing of machine learning model data through so-called compute-in-memory (CIM) processes, also referred to as "in-memory computation." Conventional CIM processes perform computation using analog signals, which may result in inaccuracy of computation results, adversely impacting neural network computations. Accordingly, techniques and apparatus are needed for performing computation-in-memory with increased accuracy.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure are directed to a neural-network-processing circuit. The neural-network-processing circuit generally includes a plurality of compute-in-memory (CIM) processing elements (PEs), a plurality of neural processing unit (NPU) PEs, and a bus coupled to the plurality of CIM PEs and to the plurality of NPU PEs.

Certain aspects of the present disclosure are directed to a method for neural network processing. The method generally includes processing data in a neural-network-processing circuit comprising a plurality of CIM PEs, a plurality of NPU PEs, and a bus coupled to the plurality of CIM PEs and to the plurality of NPU PEs; and transferring the processed data between at least one of the plurality of CIM PEs and at least one of the plurality of NPU PEs via the bus.

Certain aspects of the present disclosure are directed to a processing system. The processing system generally includes a plurality of CIM PEs, a plurality of NPU PEs, a bus coupled to the plurality of CIM PEs and to the plurality of NPU PEs, a memory having computer-executable instructions stored thereon, and one or more processors configured to execute the computer-executable instructions stored thereon to transfer processed data between at least one of the plurality of CIM PEs and at least one of the plurality of NPU PEs via the bus Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 is a table comparing DCIM and NPU for different combinations of light versus heavy inputs, depths, and kernels, in accordance with certain aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
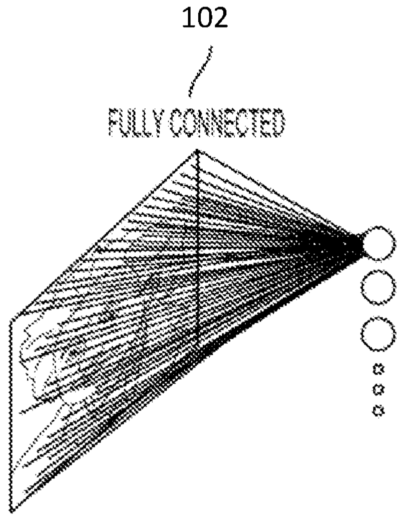
FIGS. 1A-1D depict examples of various types of neural networks, which may be implemented by aspects of the present disclosure.

Aspects of the present disclosure provide apparatus, methods, processing systems, and computer-readable mediums for performing data-intensive processing, such as implementing machine learning models. Some aspects provide a hybrid neural network architecture using both compute-in-memory (CIM) and neural processing unit (NPU) processing elements (PEs), where the CIM PEs and the NPU PEs can share resources (e.g., memory), can concurrently operate, and can transfer data from one type of PE to another type of PE within the same neural network layer or in different neural network layers (e.g., adjacent layers). For example, the CIM and NPU PEs may be coupled to the same tightly coupled memory (TCM) bus for transferring weights, activation inputs, and/or outputs. A hybrid architecture as presented herein may offer the best (or at least better) energy consumption and speed trade-offs than conventional neural network architectures utilizing only NPU PEs or only CIM PEs.

Brief Introduction to Neural Networks, Deep Neural Networks, and Deep Learning Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher-level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks (DNNs), may be designed with a variety of connectivity patterns between layers.

FIG. 1A illustrates an example of a fully connected neural network 102. In a fully connected neural network 102, each node in a first layer communicates its output to every node in a second layer, so that each node in the second layer will receive input from every node in the first layer.

Figure 1B:
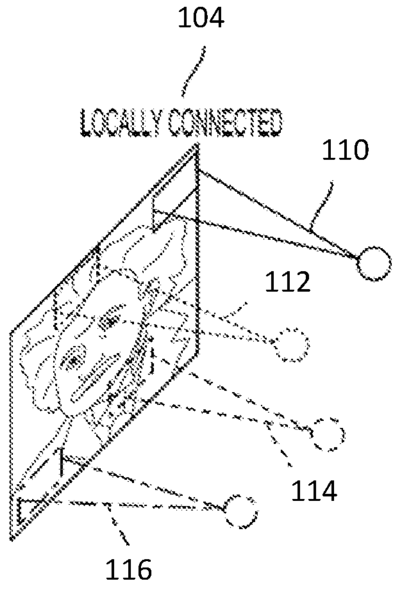

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connection strengths (or weights) that may have different values (e.g., values associated with local areas 110, 112, 114, and 116 of the first layer nodes). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
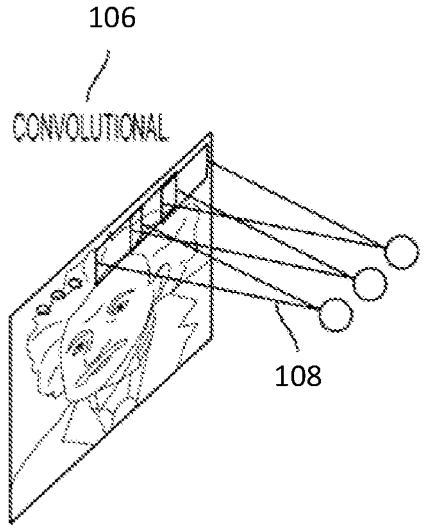

One type of locally connected neural network is a convolutional neural network (CNN). FIG. 1C illustrates an example of a convolutional neural network 106. The convolutional neural network 106 may be configured such that the connection strengths associated with the inputs for each node in the second layer are shared (e.g., for local area 108 overlapping another local area of the first layer nodes). Convolutional neural networks are well suited to problems in which the spatial locations of inputs are meaningful.

One type of convolutional neural network is a deep convolutional network (DCN). Deep convolutional networks are networks of multiple convolutional layers, which may further be configured with, for example, pooling and normalization layers.

Figure 1D:
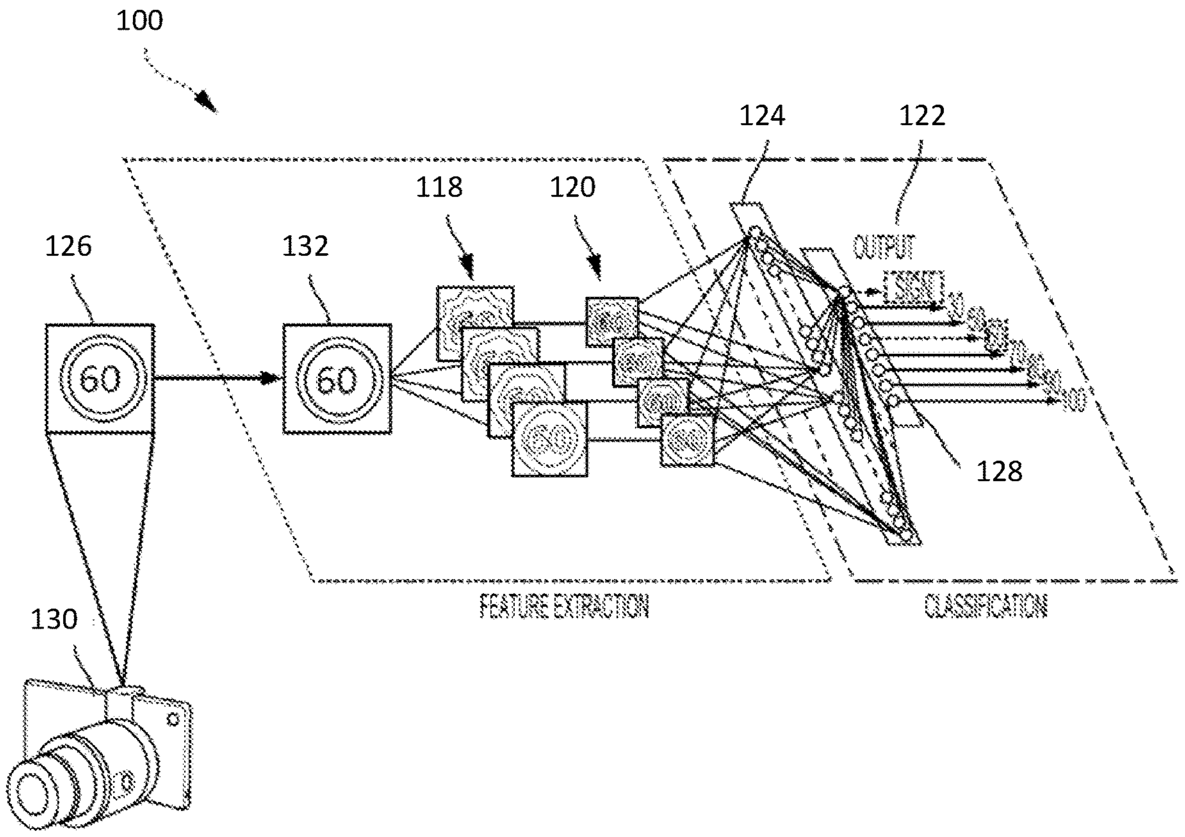

FIG. 1D illustrates an example of a DCN 100 designed to recognize visual features in an image 126 generated by an image-capturing device 130. For example, if the image-capturing device 130 is a camera mounted in or on (or otherwise moving along with) a vehicle, then the DCN 100 may be trained with various supervised learning techniques to identify a traffic sign and even a number on the traffic sign. The DCN 100 may likewise be trained for other tasks, such as identifying lane markings or identifying traffic lights. These are just some example tasks, and many others are possible.

In the example of FIG. 1D, the DCN 100 includes a feature-extraction section and a classification section. Upon receiving the image 126, a convolutional layer 132 applies convolutional kernels (for example, as depicted and described in FIG. 2) to the image 126 to generate a first set of feature maps (or intermediate activations) 118. Generally, a "kernel" or "filter" comprises a multidimensional array of weights designed to emphasize different aspects of an input data channel. In various examples, "kernel" and "filter" may be used interchangeably to refer to sets of weights applied in a convolutional neural network.

The first set of feature maps 118 may then be subsampled by a pooling layer (e.g., a max pooling layer, not shown) to generate a second set of feature maps 120. The pooling layer may reduce the size of the first set of feature maps 118 while maintaining much of the information in order to improve model performance. For example, the second set of feature maps 120 may be downsampled to a 14×14 matrix from a 28×28 matrix by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is provided to a fully connected layer 124, which in turn generates an output feature vector 128. Each feature of the output feature vector 128 may include a number that corresponds to a possible feature of the image 126, such as "sign," "60," and "100." In some cases, a softmax function (not shown) may convert the numbers in the output feature vector 128 to a probability. In such cases, an output 122 of the DCN 100 is a probability of the image 126 including one or more features.

A softmax function (not shown) may convert the individual elements of the output feature vector 128 into a probability in order that an output 122 of DCN 100 is one or more probabilities of the image 126 including one or more features, such as a sign with the number "60" thereon, as in image 126. Thus, in the present example, the probabilities in the output 122 for "sign" and "60" should be higher than the probabilities of the other elements of the output 122, such as "30," "40," "50," "70," "80," "90," and "100."

Before training the DCN 100, the output 122 produced by the DCN 100 may be incorrect. Thus, an error may be calculated between the output 122 and a target output known a priori. For example, here the target output is an indication that the image 126 includes a "sign" and the number "60." Utilizing the known target output, the weights of the DCN 100 may then be adjusted through training so that a subsequent output 122 of the DCN 100 achieves the target output (with high probabilities).

To adjust the weights of the DCN 100, a learning algorithm may compute a gradient vector for the weights. The gradient vector may indicate an amount that an error would increase or decrease if a weight were adjusted in a particular way. The weights may then be adjusted to reduce the error. This manner of adjusting the weights may be referred to as "backpropagation" because this adjustment process involves a "backward pass" through the layers of the DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, the DCN 100 may be presented with new images, and the DCN 100 may generate inferences, such as classifications, or probabilities of various features being in the new image.

Convolution Techniques for Convolutional Neural Networks

Convolution is generally used to extract useful features from an input data set. For example, in convolutional neural networks, such as described above, convolution enables the extraction of different features using kernels and/or filters whose weights are automatically learned during training. The extracted features are then combined to make inferences.

An activation function may be applied before and/or after each layer of a convolutional neural network. Activation functions are generally mathematical functions that determine the output of a node of a neural network. Thus, the activation function determines whether a node should pass information or not, based on whether the node's input is relevant to the model's prediction. In one example, where y=conv(x) (i.e., y is the convolution of x), both x and y may be generally considered as "activations." However, in terms of a particular convolution operation, x may also be referred to as "pre-activations" or "input activations" as x exists before the particular convolution, and y may be referred to as output activations or a feature map.

Figure 2:
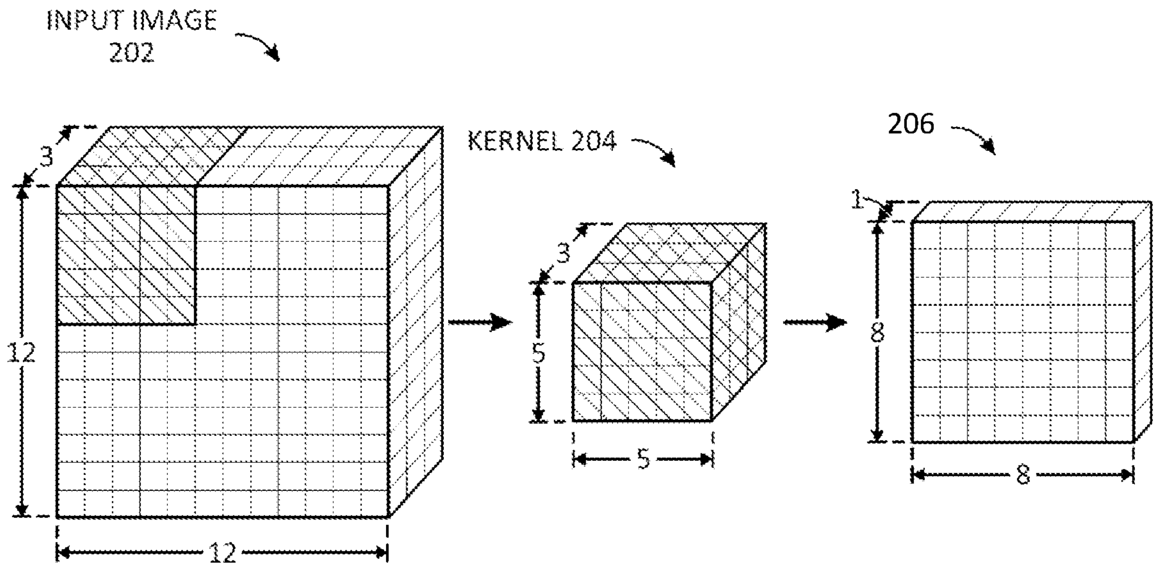
FIG. 2 depicts an example of a traditional convolution operation, which may be implemented by aspects of the present disclosure.

FIG. 2 depicts an example of a traditional convolution in which a 12-pixel×12-pixel×3-channel input image 202 is convolved using a 5×5×3 convolution kernel 204 and a stride (or step size) of 1. The resulting feature map 206 is 8 pixels×8 pixels×1 channel. As seen in this example, the traditional convolution may change the dimensionality of the input data as compared to the output data (here, from 12×12 to 8×8 pixels), including the channel dimensionality (here, from 3 channels to 1 channel). The convolution kernel 204 is shown as corresponding to a portion of the input image 202 with which the kernel is convolved to generate a single element of the feature map 206. Generally, as in this example, the depth (d=3) of the kernel 204 matches the number of channels of the input image 202.

Figure 3A:
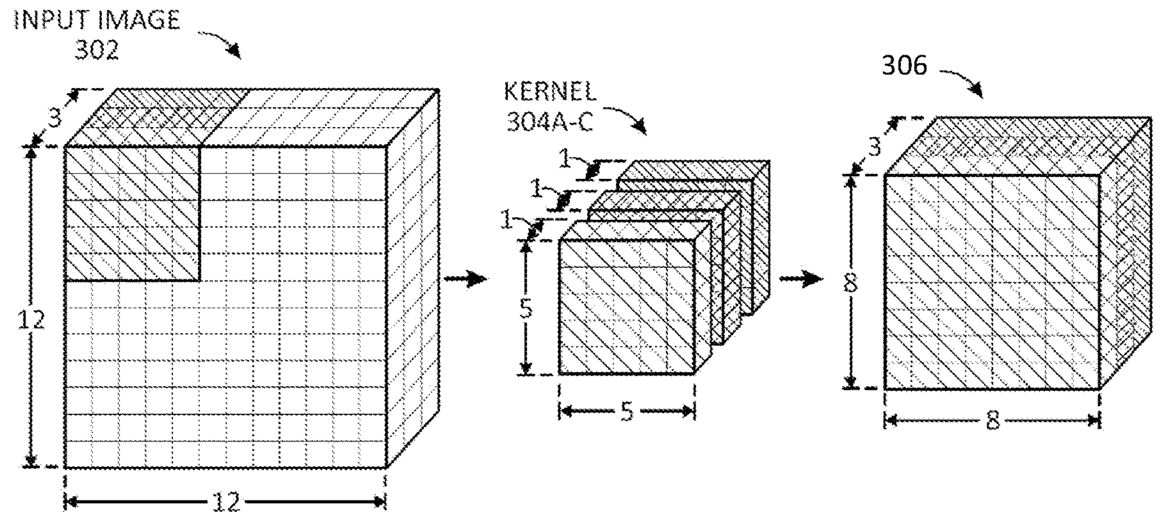
FIGS. 3A and 3B depict examples of depthwise separable convolution operations, which may be implemented by aspects of the present disclosure.
Figure 3B:
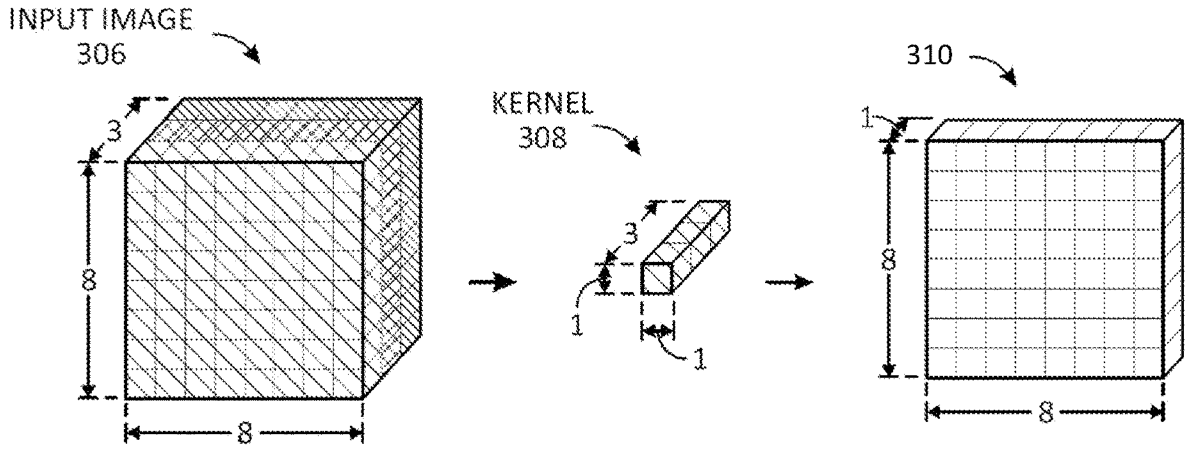

One way to reduce the computational burden (e.g., measured in floating-point operations per second (FLOPs)) and the number of parameters associated with a neural network comprising convolutional layers is to factorize the convolutional layers. For example, a spatial separable convolution, such as depicted in FIG. 2, may be factorized into two components: (1) a depthwise convolution, where each spatial channel is convolved independently by a depthwise convolution (e.g., a spatial fusion); and (2) a pointwise convolution, where all the spatial channels are linearly combined (e.g., a channel fusion). An example of a depthwise separable convolution is depicted in FIGS. 3A and 3B. Generally, during spatial fusion, a network learns features from the spatial planes, and during channel fusion, the network learns relations between these features across channels.

In one example, a depthwise separable convolution may be implemented using 5×5 kernels for spatial fusion, and 1×1 kernels for channel fusion. In particular, the channel fusion may use a 1×1×d kernel that iterates through every single point in an input image of depth d, where the depth d of the kernel generally matches the number of channels of the input image. Channel fusion via pointwise convolution is useful for dimensionality reduction for efficient computations. Applying 1×1×d kernels and adding an activation layer after the kernel may give a network added depth, which may increase the network's performance.

In particular, in FIG. 3A, the 12-pixel×12-pixel×3-channel input image 302 is convolved with a filter comprising three separate kernels 304A-C, each having a 5×5×1 dimensionality, to generate a feature map 306 of 8 pixels×8 pixels×3 channels, where each channel is generated by an individual kernel among the kernels 304A-C with the corresponding shading in FIG. 3A. Each convolution kernel 304A-C is shown as corresponding to a portion of the input image 302 with which the kernel is convolved to generate a single element of the feature map 306. The combined depth (d=3) of the kernels 304A-C here matches the number of channels of the input image 302.

Then, feature map 306 is further convolved (as shown in FIG. 3B) using a pointwise convolution operation with a kernel 308 having dimensionality 1×1×3 to generate a feature map 310 of 8 pixels×8 pixels×1 channel. As is depicted in this example, feature map 310 has reduced dimensionality (1 channel versus 3 channels), which allows for more efficient computations therewith.

Though the result of the depthwise separable convolution in FIGS. 3A and 3B is substantially similar to the traditional convolution in FIG. 2, the number of computations is significantly reduced, and thus depthwise separable convolution offers a significant efficiency gain where a network design allows it.

Though not depicted in FIG. 3B, multiple (e.g., m) pointwise convolution kernels 308 (e.g., individual components of a filter) can be used to increase the channel dimensionality of the convolution output. So, for example, m=256 1×1×3 kernels 308 can be generated, in which each output is an 8-pixel×8-pixel×1-channel feature map (e.g., feature map 310), and these feature maps can be stacked to get a resulting feature map of 8 pixels×8 pixels x 256 channels. The resulting increase in channel dimensionality provides more parameters for training, which may improve a convolutional neural network's ability to identify features (e.g., in input image 302).

Example Compute-In-Memory (CIM) Architecture

CIM-based machine learning (ML)/artificial intelligence (AI) may be used for a wide variety of tasks, including image and audio processing and making wireless communication decisions (e.g., to optimize, or at least increase, throughput and signal quality). Further, CIM may be based on various types of memory architectures, such as dynamic random-access memory (DRAM), static random-access memory (SRAM) (e.g., based on an SRAM cell as in FIG. 5), magnetoresistive random-access memory (MRAM), and resistive random-access memory (ReRAM or RRAM), and may be attached to various types of processing units, including central processing units (CPUs), digital signal processors (DSPs), graphics processing units (GPUs), field-programmable gate arrays (FPGAs), AI accelerators, and others. Generally, CIM may beneficially reduce the "memory wall" problem, which is where the movement of data in and out of memory consumes more power than the computation of the data. Thus, by performing the computation in memory, significant power savings may be realized. This is particularly useful for various types of electronic devices, such as lower power edge processing devices, mobile devices, and the like.

For example, a mobile device may include a memory device configured for storing data and performing CIM operations. The mobile device may be configured to perform an ML/AI operation based on data generated by the mobile device, such as image data generated by a camera sensor of the mobile device. A memory controller unit (MCU) of the mobile device may thus load weights from another on-board memory (e.g., flash or RAM) into a CIM array of the memory device and allocate input feature buffers and output (e.g., output activation) buffers. The processing device may then commence processing of the image data by loading, for example, a layer in the input buffer and processing the layer with weights loaded into the CIM array. This processing may be repeated for each layer of the image data, and the outputs (e.g., output activations) may be stored in the output buffers and then used by the mobile device for an ML/AI task, such as facial recognition.

As described above, conventional CIM processes may perform computation using analog signals, which may result in inaccuracies in the computation results, adversely impacting neural network computations. One emerging solution for analog CIM schemes is digital compute-in-memory (DCIM) schemes, in which computations are performed using digital signals. As used herein, the term "CIM" may refer to either or both analog CIM and digital CIM, unless it is clear from context that only analog CIM or only digital CIM is meant.

Figure 4:
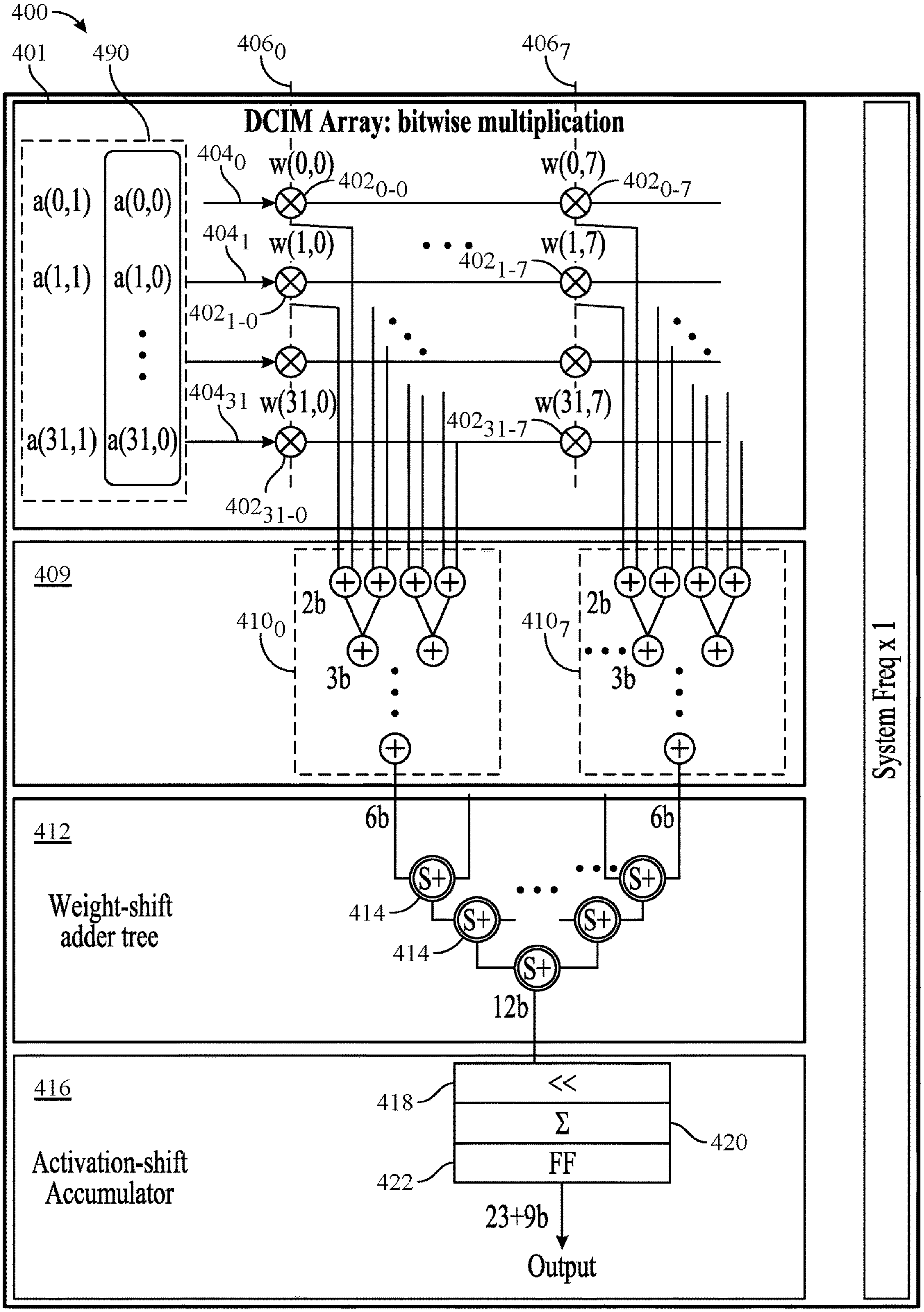
FIG. 4 is a block diagram of an example digital compute-in-memory (DCIM) architecture, in accordance with certain aspects of the present disclosure.

FIG. 4 is a block diagram of an example DCIM circuit 400, in accordance with certain aspects of the present disclosure. In a neural network architecture comprising multiple processing elements, the DCIM circuit 400 may function as a single DCIM processing element (PE).

In the example of FIG. 4, the DCIM circuit 400 includes a CIM array 401 (e.g., a DCIM array) having thirty-two word-lines $\mathbf{404}_0$ to $\mathbf{404}_{31}$ (also referred to as "rows") and eight columns $\mathbf{406}_0$ to $\mathbf{406}_7$ (e.g., each column may be composed of multiple bit-lines, such as thirty-two bit-lines). Word-lines $\mathbf{404}_0$ to $\mathbf{404}_{31}$ are collectively referred to as "word-lines (WLs) 404," and columns $\mathbf{406}_0$ to $\mathbf{406}_7$ are collectively referred to as "columns 406." While the CIM array 401 is implemented with 32 word-lines and 8 columns to facilitate understanding, the CIM array may be implemented with any number of word-lines and with any number of columns. As shown, CIM cells $\mathbf{402}_{0\text{-}0}$ to $\mathbf{402}_{31\text{-}7}$ (collectively referred to as "CIM cells 402") are implemented at the intersections of the WLs 404 and columns 406.

Each of the CIM cells 402 may be implemented using the CIM cell architecture described below with respect to FIG. 5, for example.

The CIM cells 402 may be loaded with the weight bits of a neural network. The activation inputs may be provided as an input matrix (e.g., a 32-row by 8-column matrix) to the CIM array 401, one vector at a time, or as an input vector shared across the columns (e.g., a 32-row by 1-column vector that is shared or hardwired across 8 columns). As shown in FIG. 4, activation input bits a(0,0) to a(31,0) (e.g., a first vector) may be provided to respective word-lines 404, and the CIM cells 402 may store weights w(0,0) to w(31,7) of the neural network, for example. In this case, CIM cells $\mathbf{402}_{0\text{-}0}$ to $\mathbf{402}_{0\text{-}7}$ may store weight bits w(0,0) to w(0,7), CIM cells $\mathbf{402}_{1\text{-}0}$ to $\mathbf{402}_{1\text{-}7}$ may store weight bits w(1,0) to w(1,7), and so on. Each word-line may store a multi-bit weight. For example, weight bits w(0,0) to w(0,7) may represent eight bits of a weight of a neural network (e.g., an 8-bit weight). Each CIM cell 402 may perform bit-wise multiplication of a received activation input bit with the weight bit stored in the CIM cell and pass the result to the output of the CIM cell (e.g., the read bit-line (RBL), as explained with respect to FIG. 5).

As shown, the DCIM circuit 400 may include a bit-column adder tree 409, which may include eight adder trees $\mathbf{410}_0$ to $\mathbf{410}_7$ (collectively referred to as "adder trees 410"), each adder tree being implemented for a respective one of the columns 406. Each of the adder trees 410 adds the output signals from the CIM cells 402 on the respective one of the columns 406, and the adder trees 410 may operate in parallel (e.g., concurrently). The outputs of the adder trees 410 may be coupled to a weight-shift adder tree circuit 412, as shown. The weight-shift adder tree circuit 412 includes multiple weight-shift adders 414, each including a bit-shift-and-add circuit to facilitate the performance of a bit-shifting-and-addition operation. In other words, the CIM cells on column $\mathbf{406}_0$ may store the most-significant bits (MSBs) for respective weights on each word-line 404, and the CIM cells on column $\mathbf{406}_7$ may store the least-significant bits (LSBs) for respective weights on each word-line. Therefore, when performing the addition across the columns 406, a bit-shift operation is performed to shift the bits to account for the significance of the bits on the associated column.

The output of the weight-shift adder tree circuit 412 is provided to an activation-shift accumulator circuit 416. The activation-shift accumulator circuit 416 includes a bit-shift circuit 418, a serial accumulator 420, and a flip-flop (FF) array 422. For example, the FF array 422 may be used to implement a register.

For certain aspects, the various elements of the DCIM circuit 400 of FIG. 4 may be operated with a common clock frequency (as indicated by the label "System Frequency× 1").

During operation of the DCIM circuit 400, activation circuitry 490 provides a first set of activation input bits a(0,0) to a(31,0) (e.g., a first vector in a batch of thirty-two activation input features) to the CIM cells 402 for computation during a first activation cycle. The first set of activation input bits a(0,0) to a(31,0) may represent the most-significant bits of the activation inputs, for example. The outputs of computations on each column 406 are added using a respective one of the adder trees 410. The outputs of the adder trees 410 are added using the weight-shift adder tree circuit 412, the results of which are provided to the activation-shift accumulator circuit 416. The same operation is performed for other sets of activation input bits (other input vectors in the batch) during subsequent activation cycles, such as activation input bits a(0,1) to a(31,1) (e.g., a second vector) that may represent the second most-significant bits of the activation inputs, and so on until activation input bits representing the least-significant bits of the activation inputs are processed. The bit-shift circuit 418 performs a bit-shift operation based on the activation cycle. For example, for an 8-bit activation input processed using eight activation cycles, the bit-shift circuit 418 may perform an 8-bit shift for the first activation cycle, a 7-bit shift for the second activation cycle, and so on. After the activation cycles, the outputs of the bit-shift circuit 418 are accumulated using the serial accumulator 420 and stored in the FF array 422, which may be used as a register to transfer the final accumulation result to another component (e.g., an output TCM or digital post-processing logic, as described below).

The DCIM circuit 400 of FIG. 4 provides bit-wise storage and bit-wise multiplication. The adder trees 410 perform a population count addition for the columns 406. That is, each of the adder trees 410 adds the output signals of the CIM cells for a column (e.g., adding all 32 rows per column). The weight-shift adder tree circuit 412 (e.g. having three stages as shown for eight columns) combines the weighted sum generated for the eight columns (e.g., providing the accumulation result for a given activation input bit position during an activation cycle). The activation-shift accumulator circuit 416 combines the results from multiple (e.g., eight) activation cycles and outputs the final accumulation result. For example, the bit-shift circuit 418 shifts the bits at the output of the weight-shift adder tree circuit 412 based on the associated activation cycle. The serial accumulator 420 accumulates the shifted adder output generated by the bit-shift circuit 418. The transfer register implemented using the FF array 422 copies the output of the serial accumulator 420 after the computation for the last activation cycle has been completed.

The DCIM circuit 400 provides linear energy scaling across computations using different bit-sizes of activation inputs and/or weights. In other words, using the adder trees 410 and weight-shift adder tree circuit 412 provides bit-size configurability, allowing for an n-bit activation input with an m-bit weight accumulation, n and m being positive integers. The energy consumption associated with the DCIM circuit 400 may scale linearly based on the configured bit-size for the activation inputs and weights.

The example DCIM circuit 400 of FIG. 4 may be comparatively compact (in terms of area occupied) and may consume relatively low energy. However, the DCIM circuit 400 and the weight-stationary mapping used therein may have some disadvantages, which are discussed below. As used herein, the term "weight-stationary" generally refers to a re-use architecture where the neural network weights remain stationary during operation (e.g., after being initially loaded) and the inputs are streamed in. A "pseudo-weight-stationary mapping" generally refers to a weight-stationary re-use scheme that processes a batch of input features for each of multiple depth-cycles, in an effort to generate the final outputs as quickly as possible. For example, the DCIM circuit 400 enables a pseudo-weight-stationary scheme, where a batch of 32 activation input bits may be concurrently processed. A smaller batch size (e.g., 32 versus 256 features) allows the final output result to be generated more quickly, since the total number of cycles to finish running through the depth-cycles becomes much lower compared to a case in which all inputs are processed for each of the depth-cycles, which would significantly delay the output generation. As shown, weights are re-used for the different sets of activation input bits in the input batch. At the last cycle, the final outputs may be transferred to the memory (e.g., the output TCM), as described below.

Figure 5:
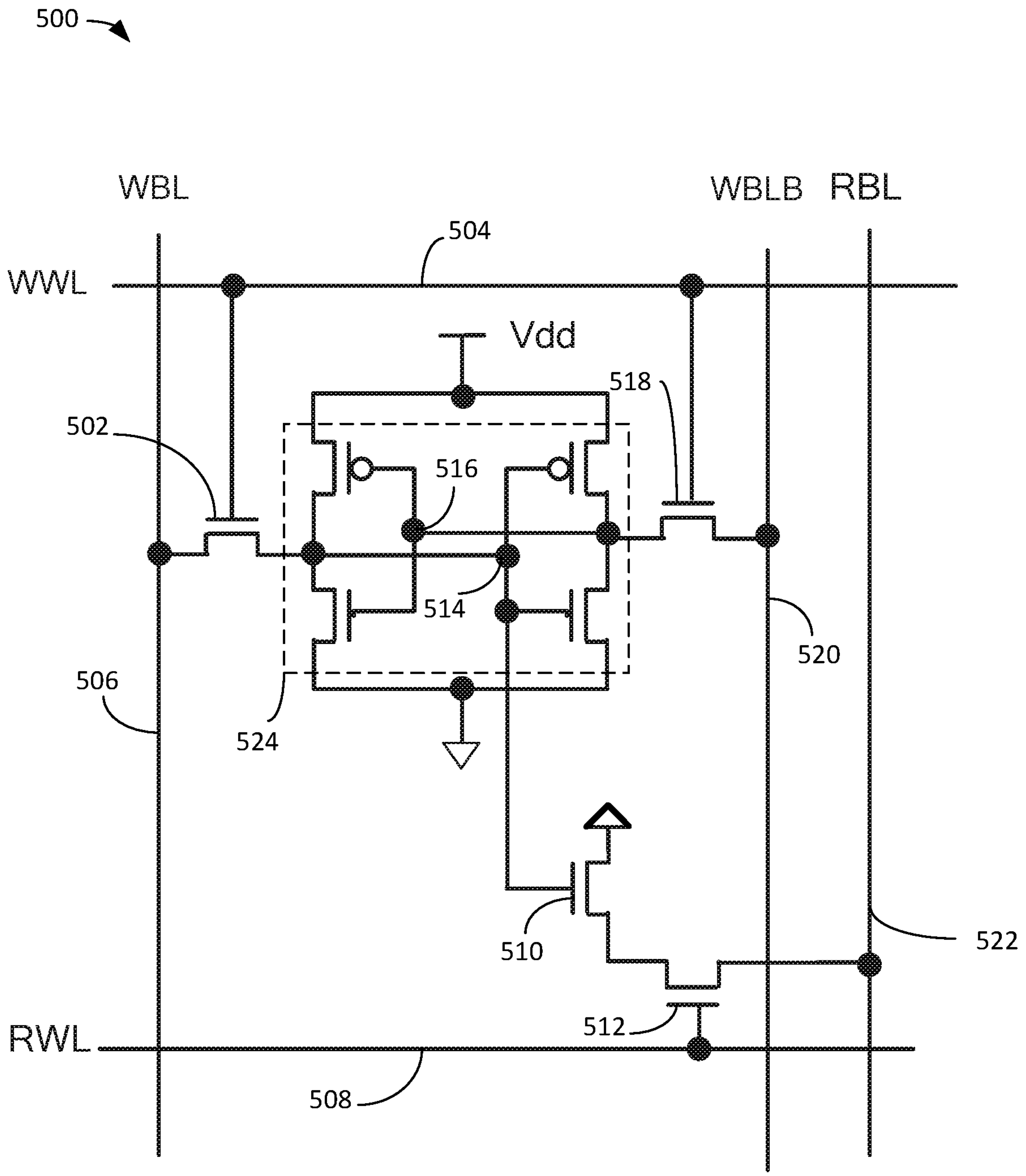
FIG. 5 illustrates an example compute-in-memory (CIM) cell for the DCIM architecture of FIG. 4, implemented as an eight-transistor (8T) static random-access memory (SRAM) cell.

FIG. 5 illustrates an example CIM cell 500 of a static random-access memory (SRAM), which may be implemented in a CIM array, such as the CIM array 401 in the DCIM circuit 400 of FIG. 4. The CIM cell 500 may be referred to as an "eight-transistor (8T) SRAM cell" because the CIM cell is implemented with eight transistors.

As shown, the CIM cell 500 may include a cross-coupled invertor pair 524 having an output 514 and an output 516. As shown, the cross-coupled invertor pair output 514 is selectively coupled to a write bit-line (WBL) 506 via a pass-gate transistor 502, and the cross-coupled invertor pair output 516 is selectively coupled to a complementary write bit-line (WBLB) 520 via a pass-gate transistor 518. The WBL 506 and WBLB 520 are configured to provide complementary digital signals to be written (e.g., stored) in the cross-coupled invertor pair 524. The WBL and WBLB may be used to store a bit for a neural network weight in the CIM cell 500. The gates of pass-gate transistors 502, 518 may be coupled to a write word-line (WWL) 504, as shown. For example, a digital signal to be written may be provided to the WBL (and a complement of the digital signal is provided to the WBLB). The pass-gate transistors 502, 518—which are implemented here as n-type field-effect transistors (NFETs)—are then turned on by providing a logic high signal to WWL 504, resulting in the digital signal being stored in the cross-coupled invertor pair 524.

As shown, the cross-coupled invertor pair output 514 may be coupled to a gate of a transistor 510. The source of the transistor 510 may be coupled to a reference potential node (Vss or electrical ground), and the drain of the transistor 510 may be coupled to a source of a transistor 512. The drain of the transistor 512 may be coupled to a read bit-line (RBL) 522, as shown. The gate of transistor 512 may be controlled via a read word-line (RWL) 508. The RWL 508 may be controlled via an activation input signal.

During a read cycle, the RBL 522 may be precharged to logic high. If both the activation input bit and the weight bit stored at the cross-coupled invertor pair output 514 are logic high, then transistors 510, 512 are both turned on, electrically coupling the RBL 522 to the reference potential node at the source of transistor 510 and discharging the RBL 522 to logic low. If either the activation input bit or the weight bit stored at the cross-coupled invertor pair output 514 is logic low, then at least one of the transistors 510, 512 will be turned off, such that the RBL 522 remains logic high. Thus, the output of the CIM cell 500 at the RBL 522 is logic low only when both the weight bit and the activation input bit are logic high, and is logic high otherwise, effectively implementing a NAND-gate operation.

Example Neural Processing Unit (NPU) Architecture

Figure 6:
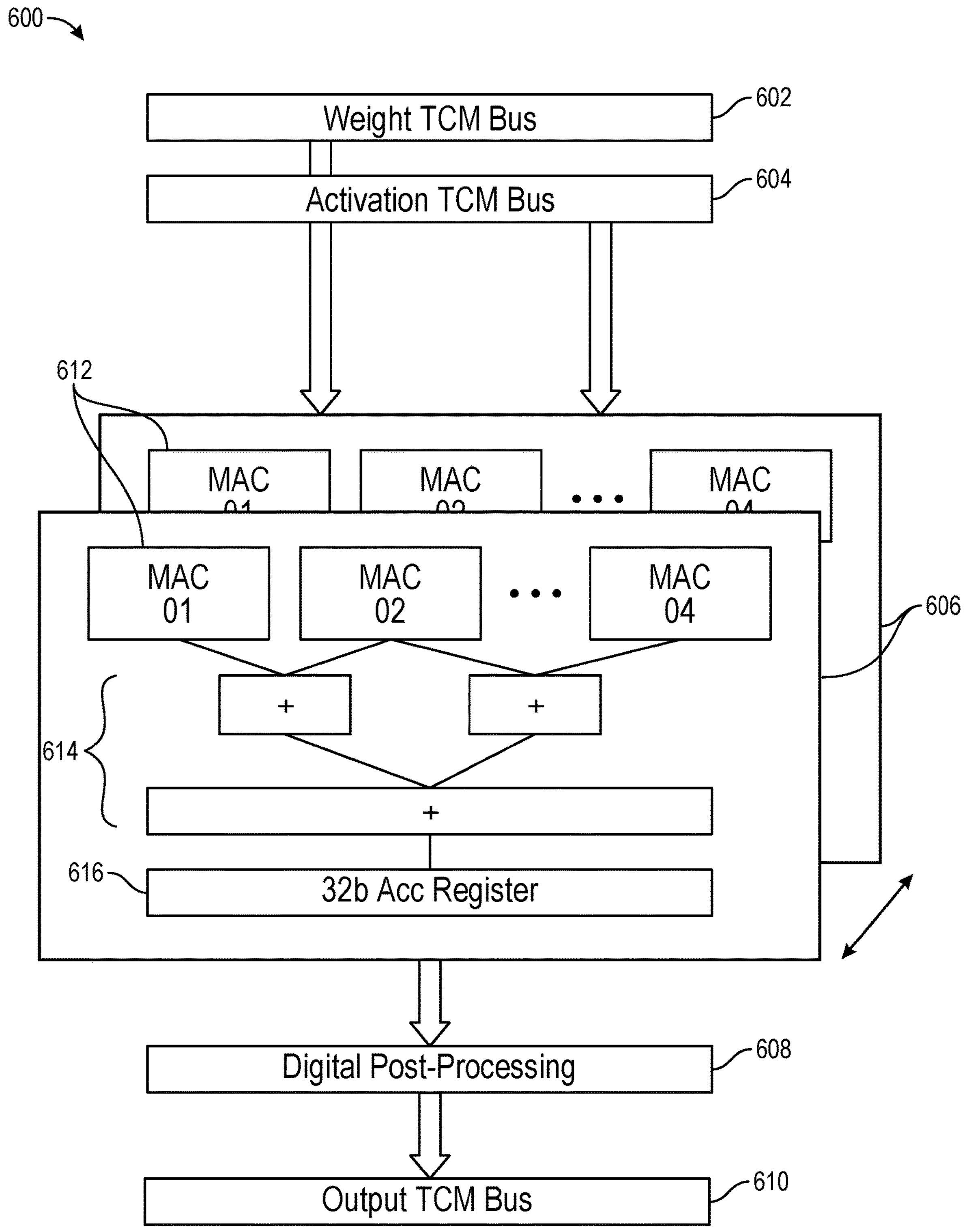
FIG. 6 is a block diagram of an example neural processing unit (NPU) architecture, in accordance with certain aspects of the present disclosure.

FIG. 6 is a block diagram of an example neural processing unit (NPU) architecture 600, in accordance with certain aspects of the present disclosure. An NPU may also be referred to as a neural network signal processor (NSP), but for consistency, the present disclosure uses the term "NPU." The NPU architecture 600 may have a weight tightly coupled memory (TCM) bus 602, an activation TCM bus 604, an output TCM bus 610, digital post-processing logic 608, and multiple NPU processing elements (PEs) 606. Each of the NPU PEs 606 may include multiple multiply-and-accumulate (MAC) units 612, an adder tree 614, and an accumulator register 616, as shown. The digital post-processing logic 608 may perform any of various suitable digital processing operations on the accumulation result from the NPU PEs, such as biasing, batch normalization (BN), linear/non-linear thresholding, quantization, etc.

The NPU architecture 600 of FIG. 6 offers parallel MAC operation for both activation inputs and weights, and a single computation cycle may generate the accumulation result. The NPU PEs 606 may use an output-stationary architecture in order to re-use the accumulator. As used herein, the term "output-stationary" generally refers to a re-use architecture where the computation results remain stationary during operation, but the inputs and weights move in opposite directions through the architecture. That being said, the NPU architecture 600 may be limited by the TCM bandwidth for feeding data (e.g., activation inputs and/or weights), and the output-stationary architecture may have a comparatively large energy penalty for weight loading at each cycle. Furthermore, each MAC unit 612 may occupy a relatively large area, such that the NPU architecture 600 may take up a lot of space.

Example Hybrid Architectures and Dataflow

As described above, compute-in-memory (CIM) technology is solving the energy and speed bottlenecks arising from moving data from memory and the processing system (e.g., the central processing unit (CPU)). CIM offers energy efficiency and significantly fewer memory accesses (e.g., global memory accesses) in weight-stationary use cases. As explained above, the term "weight-stationary" generally refers to a re-use architecture where the neural network weights remain stationary during operation (e.g., after being initially loaded) and the inputs are streamed in. Weight-stationary mapping may be used in CIM to reduce the overhead of the weight update time during operation.

Despite these benefits, CIM and other weight-stationary mapping schemes may have some challenges in certain applications. For example, the weight-stationary operation of some neural-network-processing circuits (e.g., DCIM PEs) may force these circuits to offload and reload (e.g., write and read) partial accumulation results to a memory (e.g., the output TCM) for the final accumulation. Also referred to as "partial sums," partial accumulation results are not final data, or in other words, are not yet ready to become (or to be transferred to digital post-processing logic before the results become) an activation input for the next layer nor data to be stored in the output TCM as the final result of a layer. Rather, partial sums may be temporarily stored in the output TCM and read back to the DCIM PEs for further processing in one or more cycles until the final accumulation output is ready. These partial sums may then be discarded when the final outputs are ready to be processed (e.g., by the digital post-processing logic).

In some cases, weight-stationary mapping may force the partial accumulation results to be written to a buffer memory and read back from the buffer memory for a subsequent input feature multiply-and-accumulate (MAC) operation, which may create overhead in terms of energy and a performance penalty (e.g., in terms of lower tera-operations per second (TOPS)) if this read/write cannot be handled in the same MAC cycle. In addition, CIM may have reduced flexibility, for instance when mapping to workloads with a low number of kernels and/or a low depth (e.g., a low number of neural network layers). CIM may also have limited utilization, particularly in workloads with a low number of kernels and a large number of inputs. Furthermore, CIM may most likely suffer from a performance penalty (e.g., reduced TOPS) in output-stationary workloads, due to loading CIM weights to the CIM cells row-by-row during operation. As explained above, the term "output-stationary" generally refers to a re-use architecture where the computation results remain stationary during operation, but the inputs and weights move in opposite directions through the architecture.

In contrast, NPUs are well suited to workloads favoring output-stationary mappings and/or a large degree of input feature parallelism. However, NPUs may suffer from scalability to a large number of kernels, large area occupation because of weight storage and multiplication, and a strong dependence of performance (e.g., TOPS) on memory bandwidth. Furthermore, NPUs may be limited to a low number of rows per accumulation; otherwise, there may be a speed and area penalty.

In other words, CIM units are generally better than NPUs in terms of energy efficiency, whereas NPUs are generally better than CIM units for depth-wise convolution. Due to bit-serial operation, digital compute-in-memory (DCIM) units may have lower TOPS, but comparable or better performance for a given area (e.g., in terms of TOPS/mm$^2$) than NPUs. Due to these various advantages and disadvantages presented above, a neural network architecture using only CIM units or only NPUs may not be ideal for certain applications.

Certain aspects of the present disclosure provide a hybrid architecture that uses DCIM and NPU for the best, or at least better, energy and speed trade-offs. In this hybrid architecture, the DCIM and NPU processing elements (PEs) may be able to use shared memory resources, may be able to concurrently operate, and may be able to transfer data from one compute unit (e.g., NPU/DCIM) to another (e.g., DCIM/NPU), which allows cascading within the same layer or consecutive layers of a neural network. In addition, the DCIM PEs may be implemented with a pseudo-weight-stationary mapping, and the NPU PEs may be implemented with an output-stationary mapping, such that the DCIM and NPU PEs can pipeline the data traffic within the same layer.

Figure 7A:
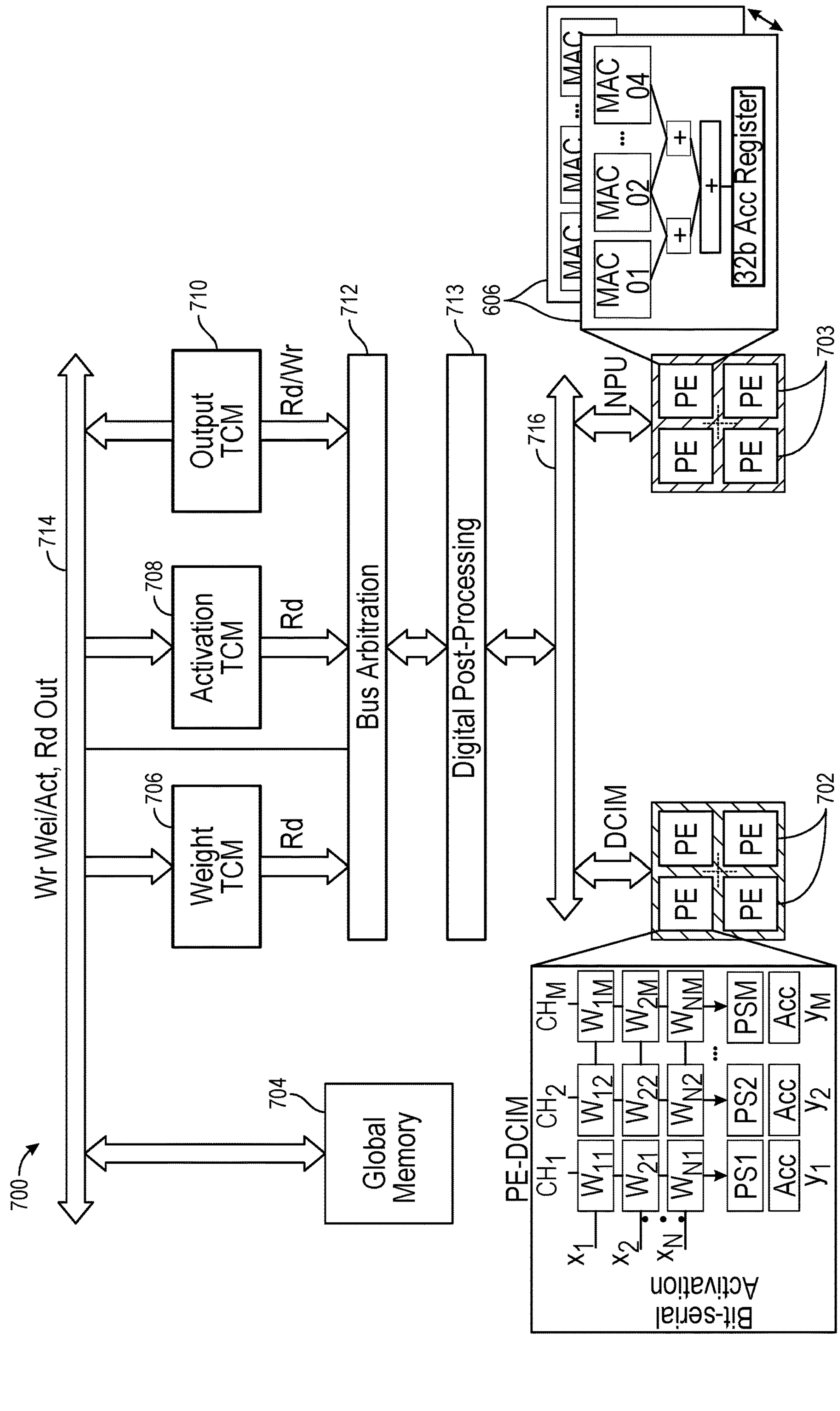
FIG. 7A is a block diagram of an example hybrid architecture with DCIM processing elements (PEs) and NPU PEs sharing resources, illustrating an example dataflow sequence, in accordance with certain aspects of the present disclosure.

FIG. 7A is a block diagram of an example hybrid architecture 700 with DCIM PEs 702 and NPU PEs 703 sharing resources, illustrating an example dataflow sequence, in accordance with certain aspects of the present disclosure. The DCIM PEs 702 may be implemented with any of various suitable DCIM circuits, such as the DCIM circuit 400 of FIG. 4. The NPU PEs 703 may be implemented with any of various suitable NPU circuits, such as the NPU PEs 606 described with respect to FIG. 6. The hybrid architecture 700 may also include a global memory 704, a weight tightly coupled memory (TCM) 706, an activation TCM 708, an output TCM 710, bus arbitration logic 712, digital post-processing logic 713, a memory bus 714, and a PE bus 716 (e.g., common bus with a FIFO). As used herein, a "TCM" generally refers to a memory accessed by a dedicated connection from the processor(s), such as the PEs 702, 703. Although shown as separate TCMs, the weight TCM 706, the activation TCM 708, and/or the output TCM 710 may be combined. The memory bus 714 may couple the global memory 704 to the weight TCM 706, the activation TCM 708, and the output TCM 710. The PE bus 716 may couple the DCIM PEs 702, the NPU PEs 703, and the digital post-processing logic 713 together. In this manner, the DCIM PEs 702 and the NPU PEs 703 may share the memory resources (e.g., the weight TCM, the activation TCM, and the output TCM).

In the dataflow sequence shown, weights may be loaded from the global memory 704 to the weight TCM 706. Then, the weights may be loaded from the weight TCM 706 to the PE weight arrays (e.g., in the CIM cells of the DCIM PEs 702 and/or in weight registers of the NPU PEs 703). Activation inputs may be loaded from the global memory 704 to the activation TCM 708 via the memory bus 714. Then, the activation inputs may be loaded from the activation TCM 708 to the PE bus 716 (or at least a portion of the PE bus operating as an activation bus). After the weights have been loaded in the PEs and the activations are ready on the activation bus, the DCIM PEs 702 and the NPU PEs 703 may perform computations (e.g., MAC operations) over multiple computation cycles to generate final accumulation results. The final accumulation results may be processed by the digital post-processing logic 713, and the processed results may be written to the output TCM 710, as controlled by the bus arbitration logic 712. From the output TCM 710, the processed results may be loaded in the global memory 704 via the memory bus 714.

Figure 7B:
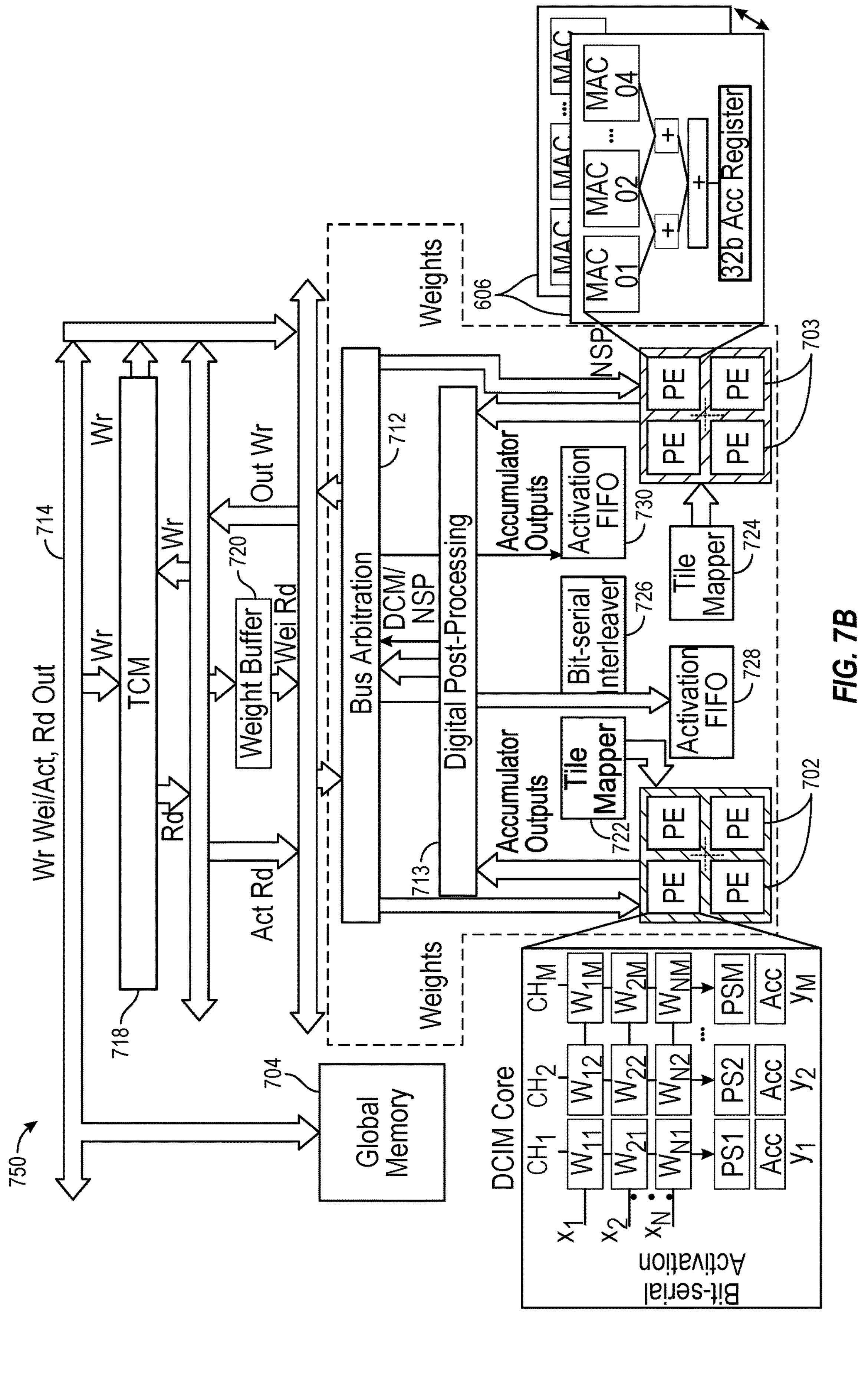
FIG. 7B is a block diagram of an example hybrid architecture with DCIM PEs and NPU PEs sharing resources and with first-in, first-out (FIFO) circuits for enabling data exchange, in accordance with certain aspects of the present disclosure.

FIG. 7B is a block diagram of another example hybrid architecture 750 with DCIM PEs 702 and NPU PEs 703 sharing resources and with first-in, first-out (FIFO) circuits for enabling data exchange, in accordance with certain aspects of the present disclosure. The DCIM PEs 702 may be implemented with any of various suitable DCIM circuits, such as the DCIM circuit 400 of FIG. 4. The NPU PEs 703 may be implemented with any of various suitable NPU circuits, such as the NPU PEs 606 described with respect to FIG. 6. The hybrid architecture 750 may also include a global memory 704, one or more TCMs 718 (for storing weights, activation inputs, and/or outputs), a weight buffer 720, bus arbitration logic 712, digital post-processing logic 713, a DCIM PE tile mapper 722, an NPU PE tile mapper 724, a bit-serial interleaver 726, a DCIM PE activation FIFO 728, an NPU PE activation FIFO 730, and a memory bus 714 (also referred to as a "TCM bus"). The memory bus 714 may couple the global memory 704 to the one or more TCMs 718 and to the bus arbitration logic 712. The memory bus 714 may also couple the one or more TCMs 718 to the input of the weight buffer 720 and to the bus arbitration logic 712. The memory bus 714 may also couple the output of the weight buffer 720 to the bus arbitration logic 712. The bus arbitration logic 712 may route weights to the DCIM PEs 702 and to the NPU PEs 703 and may route activation inputs to the different activation FIFOs (e.g., 728, 730). The bus arbitration logic 712 may also receive outputs (e.g., final accumulation results or partial sums) from the digital post-processing logic 713. In this manner, the DCIM PEs 702 and the NPU PEs 703 may share the memory resources (e.g., the one or more TCMs 718). The dataflow sequence for the hybrid architecture 750 may be similar to the dataflow sequence explained above for the hybrid architecture 700.

For the hybrid architectures 700, 750, the digital post-processing logic 713 may process the output data, with functions such as biasing, batch normalization, linear/non-linear thresholding, quantization, etc. Activation inputs are received from the bus arbitration logic 712, which may select either of the following, to prepare the activation inputs for either or both of the DCIM PEs 702 and the NPU PEs 703, and to write the activation inputs to the corresponding activation FIFO 728 or 730: (1) activation data directly read from the TCM(s) 718 (typically for the first layer of a network, where data may have originated from the actual video, audio, or other sensor input); or (2) activation data read from the digital post-processing logic 713 (typically for intermediate layers of the network, where accumulator outputs from the DCIM and/or NPU PEs are processed). Each of the activation FIFOs 728 or 730 may be implemented using an array of flops, dual-port SRAM memory, or a register file with one write port and read port. The bus arbitration logic 712 may be implemented by a combinatorial circuit consisting of (de)multiplexers routing the input data to multiple destinations. The data destination may be controlled by a mapper module, which may make destination decisions based on the layer workload.

The pseudo-weight-stationary dataflow of the DCIM PEs 702 generates partial-sum accumulator results. Partial sums are not final data, or in other words, are not yet ready to become an activation input for the next layer nor data to be stored in the output TCM as the final result of a layer. Rather, partial sums may be temporarily stored in the output TCM and read back to the DCIM PEs 702 for further processing in one or more cycles until the final output is ready. These partial sums may then be discarded when the final outputs are ready to be processed by the digital post-processing logic 713.

Partial sum outputs may be routed through the bus arbitration logic 712, sent to the output TCM, read back again, and then sent back to the DCIM PEs 702 through the bus arbitration logic 712. The accumulator outputs from the DCIM PEs 702 may be sent to the digital post-processing logic 713 for processing and then to the bus arbitration logic 712. In the case of partial sums, the accumulator output going to the digital post-processing logic 713 may be fed therethrough (e.g., without being processed by the digital post-processing logic). If the accumulator output is a final accumulator result, the accumulator output is processed by the digital post-processing logic 713. The digital post-processing logic sends this processed output to the bus arbitration logic 712, and then the bus arbitration logic 712 sends this data to either the output TCM or as the activation input of another network layer.

For weight reads, the DCIM PEs 702 are pseudo-weight-stationary, need not have frequent weight writing, and may have no weight broadcast scheme. Because of this pseudo-weight-stationary architecture in the DCIM PEs 702 and the less-frequent weight writes, the amount of MAC stalls may be significantly reduced. In contrast, the NPU PEs 703 are output-stationary with frequent weight writing and a weight broadcast scheme allowing weight sharing across parallel inputs.

For input reads, the DCIM PEs 702 have fewer activation reads because of lower kernel cycles enabled by a large number of mapped kernels (e.g., 32 kernels running in parallel). In contrast, the frequent weight access of the NPU PEs 703 may lead to a pairing of spatially mapped input features, as well as a pairing of spatially mapped kernels (e.g., 8 input features running in parallel, as well as 8 kernels running in parallel). Otherwise, there may be a significant weight-access penalty due to repeated weight reads if the number of cycles to complete the full set of input features increases.

FIG. 8 is a table 800 comparing DCIM and NPU for different combinations of light versus heavy inputs, depths, and kernels, in accordance with certain aspects of the present disclosure. For example, 010 in the table 800 represents light inputs, heavy depth, and light kernels, whereas 101 represents heavy inputs, light depths, and heavy kernels. From the table 800, one can determine that DCIM is generally better than NPU in terms of energy efficiency. However, NPU is better than DCIM in depth-wise convolution, for example.

Figure 9:
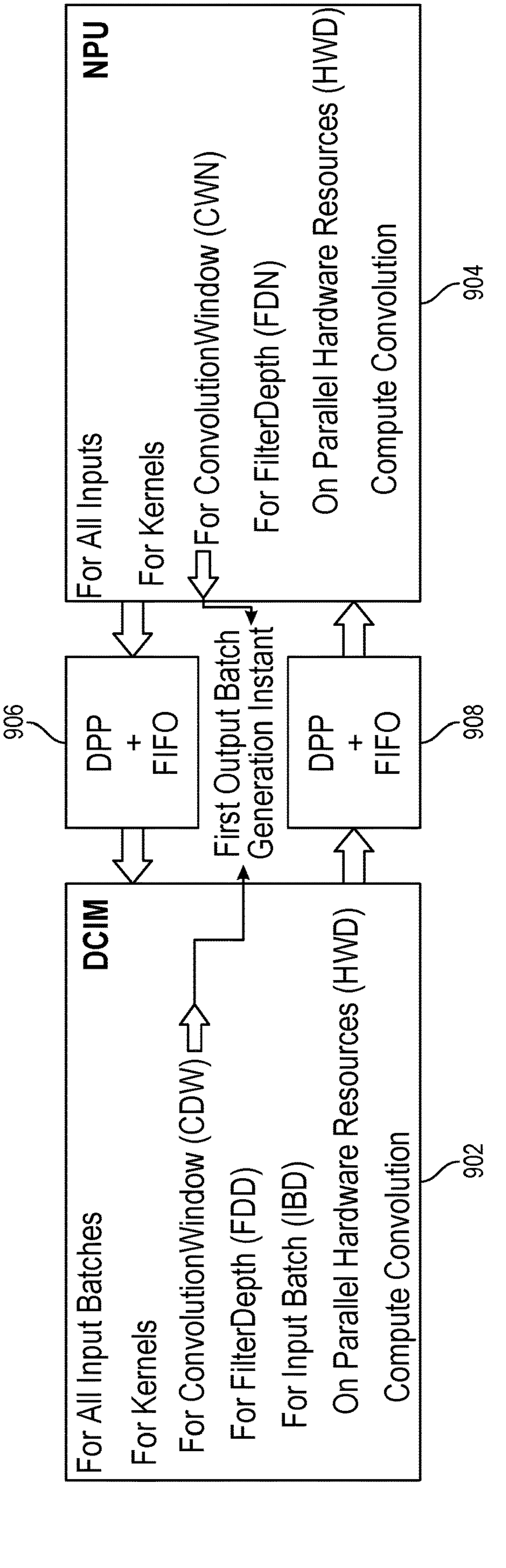
FIG. 9 is a block diagram of data exchanges between an example DCIM PE and an example NPU PE in a hybrid architecture, in accordance with certain aspects of the present disclosure.

FIG. 9 is a block diagram 900 of data exchanges between an example DCIM PE 902 and an example NPU PE 904 in a hybrid architecture, using the appropriate activation FIFO and the digital post-processing (DPP) logic 906, 908, in accordance with certain aspects of the present disclosure. For example, the DCIM PE 902 may generate a first output batch (HWD outputs) after CWD×FDD×IBD cycles, where HWD is the number of output bytes generated by parallel hardware for the DCIM PE 902, CWD is the convolution window for the DCIM PE 902, FDD is the filter depth for the DCIM PE 902, and IBD is the input batch size for the DCIM PE 902. In other words, the hardware resources are a spatial mapping of parallel inputs, parallel kernels, filter depth, and a convolution window. Loops that do not fit the hardware resources may be run in sequential clock cycles.

Likewise, the NPU PE 904 may generate a first output batch (HWN outputs) after CWN×FDN cycles, where HWN is the number of output bytes generated by parallel hardware for the NPU PE 904, CWN is the convolution window for the NPU PE 904, and FDN is the filter depth for the NPU PE 904. For certain aspects, CWN×FDN may be less than 8×CWD×FDD since the DCIM PE (e.g., in the case of the circuit 400 of FIG. 4) has more than 32 activations per accumulation, while the NPU PE 904 has 4 activations per accumulation. In some cases, the input batch size for the DCIM PE 902 is selected small enough (e.g., IBD≤32) to reduce the output latency and therefore reduce the activation FIFO size, but large enough (e.g., IBD≥7) to amortize the weight loading time and to keep the weight re-use factor high.

Figure 10:
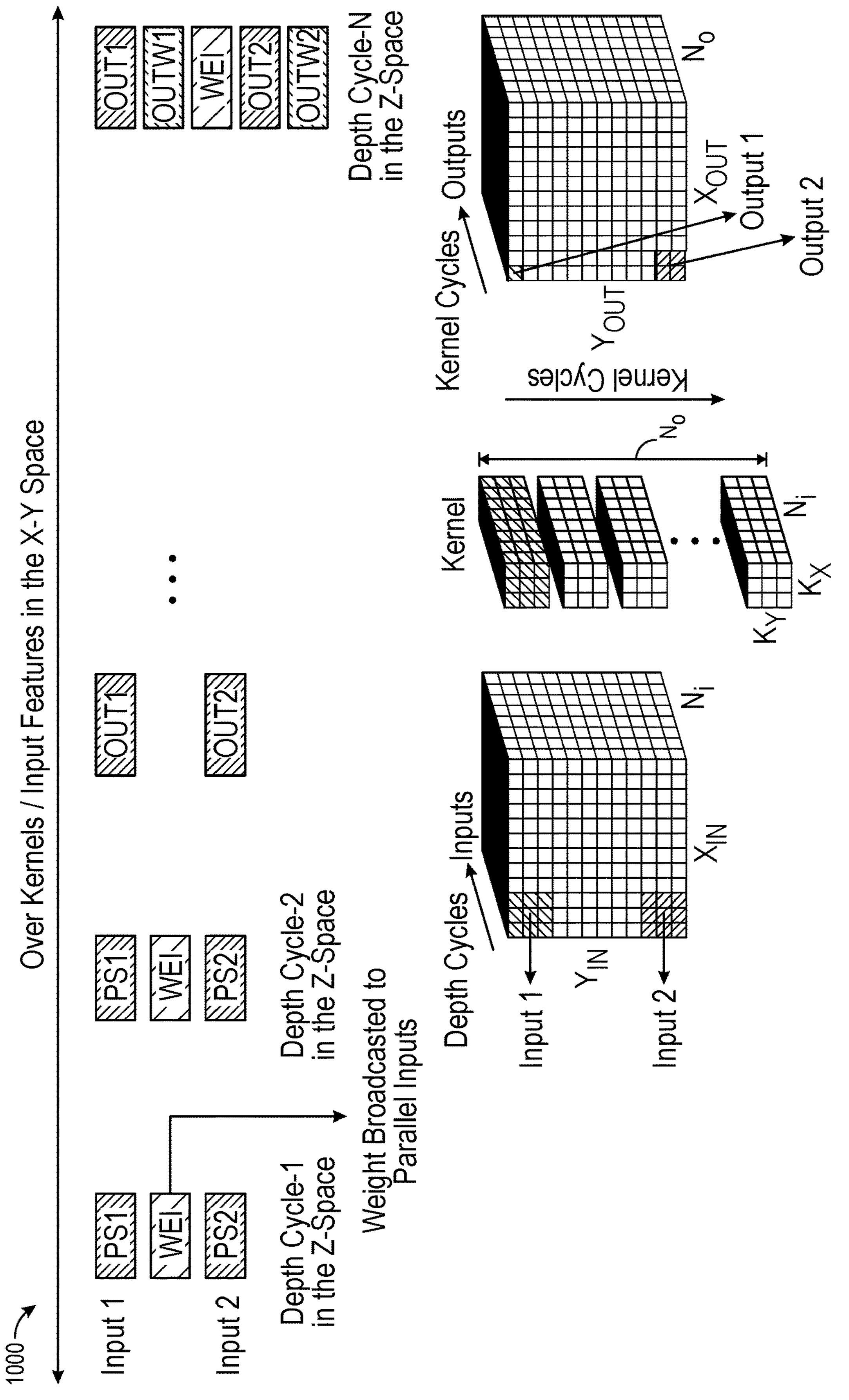
FIG. 10 illustrates an example output-stationary mapping for NPU PEs, in accordance with certain aspects of the present disclosure.

FIG. 10 illustrates an example output-stationary mapping scheme 1000 with dataflow timing for NPU PEs (e.g., NPU PEs 606), in accordance with certain aspects of the present disclosure. In this example, a depth-first implementation may enable the output-stationary mapping scheme. Partial sums (e.g., partial sums labeled "PS1" and "PS2") may be re-used by the accumulator within each NPU PE. For certain aspects, there may be multiple inputs (e.g., inputs labeled "Input1" and "Input2") running in parallel. While only two inputs are shown, there may be more than two inputs depending on the number of NPU PEs. For each clock cycle, a depth cycle will be run.

Each depth cycle may involve obtaining a weight update, which may result in a low weight use factor and an energy penalty. After the weight update is obtained, the updated weight may be broadcasted to each parallel input (e.g., Input1 and Input2). Every depth cycle, one slice at depth $N_i$ is read. For example, during the first depth cycle, a slice of depth $N_1$ is read, during the second depth cycle, a second slice of depth $N_2$ is read, and so on for each depth $N_i$. The accumulation during the depth cycles may be performed by the accumulator(s) within each NPU PE to generate outputs (e.g., outputs labeled "OUT1" and "OUT2") in the final accumulator (e.g., the accumulator register 616). As a result, the partial sums (e.g., PS1, PS2) need not be written to a memory or a register file, and the output traffic to the memory may be reduced. When the depth cycles are completed, the final accumulator value (e.g., values labeled "OUTW1" and "OUTW2") may be written to the memory (e.g., output TCM)—in some cases after being transferred to the digital post-processing logic—or may be directly ported to DCIM, as described above. The use of input parallelism in the NPU PE improves the weight use factor and improves performance (e.g., TOPS).

Figure 11:
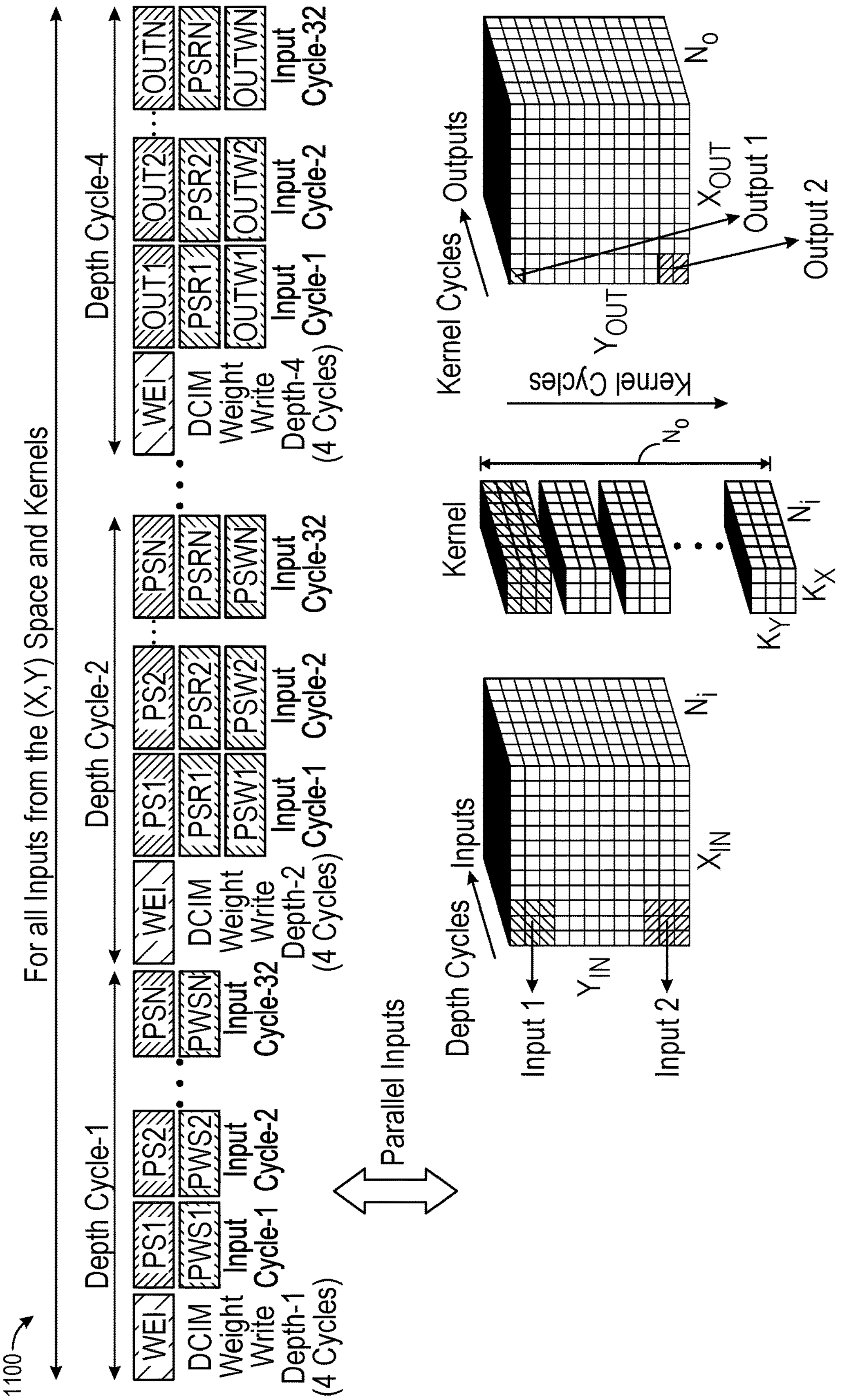
FIG. 11 illustrates an example pseudo-weight-stationary mapping for DCIM PEs, in accordance with certain aspects of the present disclosure.

FIG. 11 illustrates an example pseudo-weight-stationary mapping scheme 1100 with dataflow timing for DCIM PEs (e.g., the DCIM PEs 702), in accordance with certain aspects of the present disclosure. This pseudo-weight-stationary mapping scheme is an input-batch implementation and is preferentially weight stationary. The pseudo-weight-stationary scheme processes a batch of input features for each of multiple depth-cycles. A smaller batch size allows the final output result to be generated more quickly, since the total number of cycles to finish running through the depth-cycles becomes much lower compared to a case in which all inputs are processed for each of the depth-cycles, which would significantly delay the output generation. In this pseudo-weight stationary implementation, the DCIM PE may be globally input stationary to maintain the output TCM size storing the partial sums and reasonable output latency. This may also reduce the depth of the NPU PE activation FIFO, by limiting the amount of final outputs generated from the DCIM PE.

As shown, weights are re-used for the input batch. For example, the weights may be loaded in for a 4-cycle period at the beginning of a depth-cycle, as shown. In certain aspects, the entirety of a feature map may not be completed in one depth-cycle, and multiple depth-cycles may be utilized to expand the input feature map. For example, the number of input-cycles used to expand the input feature map in a depth-cycle may be 32, as shown. The number of depth-cycles used to load weights and the number of depth-cycles used to expand a feature map may be set in accordance with the number of clock cycles within the depth-cycle. "PSW" represents a partial sum output written to an output TCM, whereas "PSR" represents a partial sum output read back from the output TCM. At the last depth-cycle, the final outputs (e.g., OUTW1, OUTW2, . . . , and OUTWN) may be transferred to the output TCM—in some cases after being transferred to the digital post-processing logic—or to a temporary memory between NPU and DCIM, as described above.

Certain aspects of the present disclosure provide a hybrid neural network architecture and circuitry that combines DCIM and NPU technologies, allowing for the best (or at least better) energy and speed trade-offs when implementing a neural network. Such a hybrid architecture may enable a workload execution for energy and/or performance (e.g., TOPS) optimized (or at least enhanced) through the use of either or both NPU and DCIM PEs. The DCIM PEs and the NPU PEs are able to use the shared memory resources (e.g., TCM(s)) for any or a combination of weight, activation, and output. Pseudo-weight-stationary DCIM PEs and output-stationary NPU PEs allow fast data porting (and reduced depth of FIFOs in such porting) from one compute unit (e.g., NPU/DCIM) to another compute unit, (e.g., DCIM/NPU) allowing concurrent operation of DCIM and NPU PEs. In this manner, the DCIM PEs and NPU PEs can pipeline the data traffic within the same layer and/or can cascade the data between consecutive layers.

Example Operations for Data Processing with a Hybrid Architecture

Figure 12:
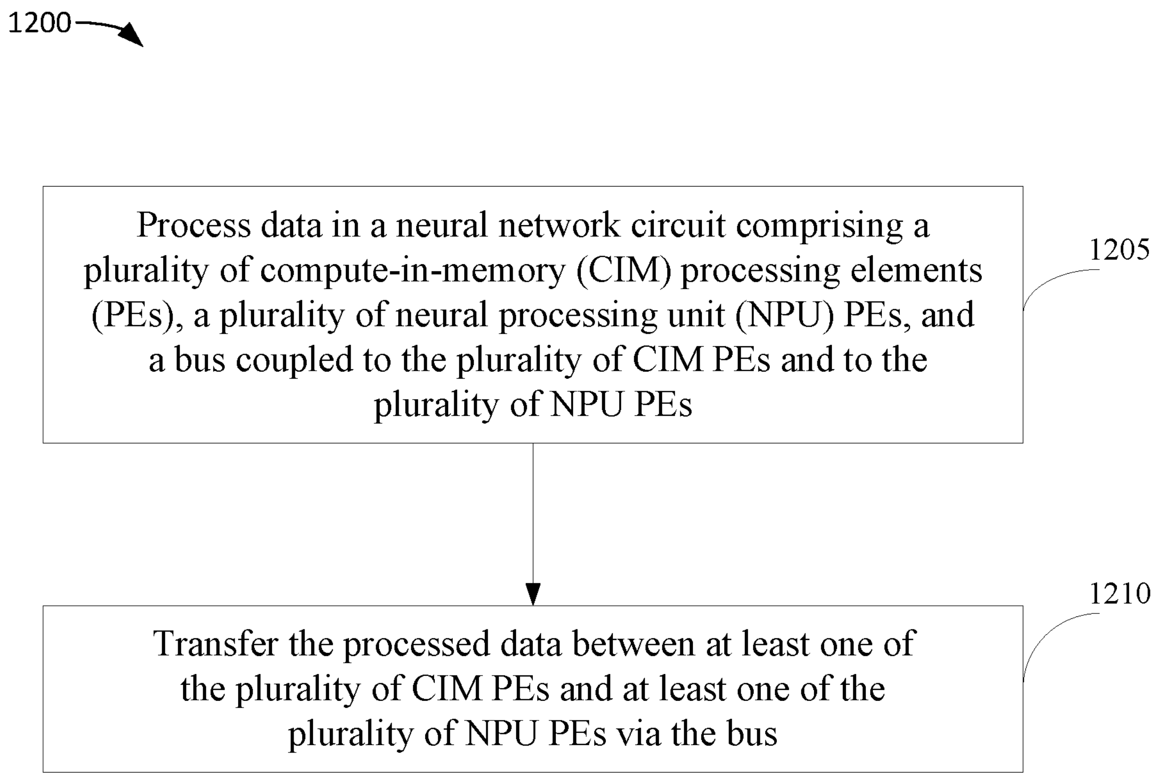
FIG. 12 is a flow diagram illustrating example operations for neural network processing, in accordance with certain aspects of the present disclosure.

FIG. 12 is a flow diagram illustrating example operations 1200 for neural network processing, in accordance with certain aspects of the present disclosure. The operations 1200 may be performed by a hybrid neural network circuit, such as the hybrid architecture 700 or 750 described with respect to FIG. 7A or 7B, respectively.

The operations 1200 may begin at block 1205 with the circuit processing data. The circuit includes a plurality of compute-in-memory (CIM) processing elements (PEs) (e.g., DCIM PEs 702), a plurality of neural processing unit (NPU) PEs (e.g., NPU PEs 703), and a bus (e.g., PE bus 716) coupled to the plurality of CIM PEs and to the plurality of NPU PEs. At block 1210, the processed data is transferred between at least one of the plurality of CIM PEs and at least one of the plurality of NPU PEs via the bus.

According to certain aspects, the neural network circuit further includes at least one of a global memory (e.g., global memory 704) or a tightly coupled memory (TCM) (e.g., the weight TCM 706, the activation TCM 708, the output TCM 710, or the one or more TCMs 718). In this case, the transferring at block 1210 may involve transferring the processed data between the at least one of the plurality of CIM PEs and the at least one of the plurality of NPU PEs via the bus without writing the processed data to the at least one of the global memory or the TCM.

Example Device with Hybrid Architecture

Figure 13:
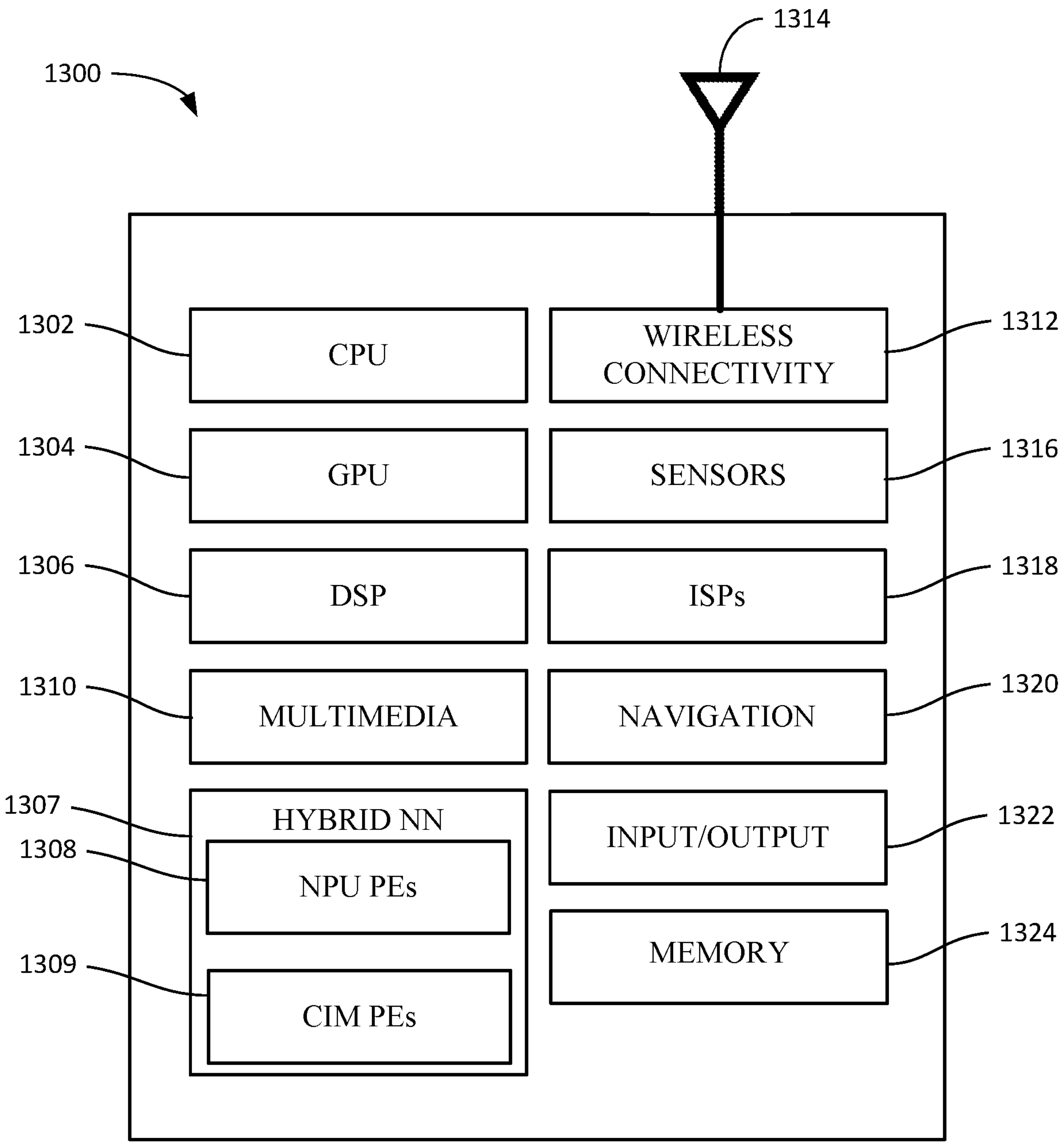
FIG. 13 is a block diagram illustrating an example electronic device having a hybrid architecture configured to perform machine learning tasks, in accordance with certain aspects of the present disclosure.

FIG. 13 illustrates an example electronic device 1300. The electronic device 1300 may be configured to perform the methods described herein, including the operations 1200 described with respect to FIG. 12.

The electronic device 1300 includes a central processing unit (CPU) 1302, which in some aspects may be a multi-core CPU. Instructions executed at the CPU 1302 may be loaded, for example, from a program memory associated with the CPU 1302 or may be loaded from a memory 1324.

The electronic device 1300 also includes additional processing blocks tailored to specific functions, such as a graphics processing unit (GPU) 1304, a digital signal processor (DSP) 1306, a hybrid neural network 1307 with neural processing unit (NPU) processing elements (PEs) 1308 and compute-in-memory (CIM) PEs 1309, a multimedia processing block 1310, and a wireless connectivity processing block 1312. In one implementation, the hybrid neural network 1307 is implemented in one or more of the CPU 1302, GPU 1304, and/or DSP 1306.

In some aspects, the wireless connectivity processing block 1312 may include components, for example, for Third-Generation (3G) connectivity, Fourth-Generation (4G) connectivity (e.g., 4G LTE), Fifth-Generation connectivity (e.g., 5G or NR), Wi-Fi connectivity, Bluetooth connectivity, and/or wireless data transmission standards. The wireless connectivity processing block 1312 is further connected to one or more antennas 1314 to facilitate wireless communication.

The electronic device 1300 may also include one or more sensor processors 1316 associated with any manner of sensor, one or more image signal processors (ISPs) 1318 associated with any manner of image sensor, and/or a navigation processor 1320, which may include satellite-based positioning system components (e.g., Global Positioning System (GPS) or Global Navigation Satellite System (GLONASS)) as well as inertial positioning system components.

The electronic device 1300 may also include one or more input and/or output devices 1322, such as screens, touch-sensitive surfaces (including touch-sensitive displays), physical buttons, speakers, microphones, and the like. In some aspects, one or more of the processors of the electronic device 1300 may be based on an Advanced RISC Machines (ARM) instruction set, where RISC stands for "reduced instruction set computing."

The electronic device 1300 also includes memory 1324, which is representative of one or more static and/or dynamic memories, such as a dynamic random access memory (DRAM), a flash-based static memory, and the like. In this example, memory 1324 includes computer-executable components, which may be executed by one or more of the aforementioned processors of the electronic device 1300, including the hybrid neural network 1307. The depicted components, and others not depicted, may be configured to perform various aspects of the methods described herein.

In some aspects, such as where the electronic device 1300 is a server device, various aspects may be omitted from the example depicted in FIG. 13, such as one or more of the multimedia processing block 1310, wireless connectivity processing block 1312, antenna(s) 1314, sensor processors 1316, ISPs 1318, or navigation processor 1320.

Example Clauses

In addition to the various aspects described above, specific combinations of aspects are within the scope of the disclosure, some of which are detailed in the clauses below:

Clause 1: A neural network circuit comprising a plurality of compute-in-memory (CIM) processing elements (PEs), a plurality of neural processing unit (NPU) PEs, and a bus coupled to the plurality of CIM PEs and to the plurality of NPU PEs.

Clause 2: The neural network circuit of Clause 1, further comprising one or more shared memory resources coupled to the plurality of CIM PEs and to the plurality of NPU PEs.

Clause 3: The neural network circuit of Clause 2, wherein the one or more shared memory resources comprise a tightly coupled memory (TCM).

Clause 4: The neural network circuit of Clause 3, wherein the TCM is configured to store at least one of activations, weights, or outputs.

Clause 5: The neural network circuit of Clause 3 or 4, wherein at least one of the plurality of CIM PEs is configured to transfer data to at least one of the plurality of NPU PEs.

Clause 6: The neural network circuit of Clause 5, wherein the at least one of the plurality of CIM PEs is configured to transfer the data to the at least one of the plurality of NPU PEs without the data being written to or being read from the TCM.

Clause 7: The neural network circuit of any of Clauses 3-6, wherein at least one of the plurality of NPU PEs is configured to transfer data to at least one of the plurality of CIM PEs.

Clause 8: The neural network circuit of Clause 7, wherein the at least one of the plurality of NPU PEs is configured to transfer the data to the at least one of the plurality of CIM PEs without the data being written to or being read from the TCM.

Clause 9: The neural network circuit of any of Clauses 1-4, wherein at least one of the plurality of CIM PEs is configured to transfer data to at least one of the plurality of NPU PEs.

Clause 10: The neural network circuit of Clause 9, further comprising a global memory, wherein the at least one of the plurality of CIM PEs is configured to transfer the data to the at least one of the plurality of NPU PEs without the data being written to or being read from the global memory.

Clause 11: The neural network circuit of Clause 9 or 10, wherein the at least one of the plurality of CIM PEs is in a same neural network layer as the at least one of the plurality of NPU PEs.

Clause 12: The neural network circuit of Clause 9 or 10, wherein the at least one of the plurality of CIM PEs is in a first neural network layer and wherein the at least one of the plurality of NPU PEs is in a second neural network layer, different from the first neural network layer.

Clause 13: The neural network circuit of Clause 12, wherein the second neural network layer is adjacent to the first neural network layer.

Clause 14: The neural network circuit of any of Clauses 1-6 and 9, wherein at least one of the plurality of NPU PEs is configured to transfer data to at least one of the plurality of CIM PEs.

Clause 15: The neural network circuit of Clause 14, further comprising a global memory, wherein the at least one of the plurality of NPU PEs is configured to transfer the data to the at least one of the plurality of CIM PEs without the data being written to or being read from the global memory.

Clause 16: The neural network circuit of Clause 14 or 15, wherein the at least one of the plurality of NPU PEs is in a same neural network layer as the at least one of the plurality of CIM PEs.

Clause 17: The neural network circuit of Clause 14 or 15, wherein the at least one of the plurality of NPU PEs is in a first neural network layer and wherein the at least one of the plurality of CIM PEs is in a second neural network layer, different from the first neural network layer.

Clause 18: The neural network circuit of Clause 17, wherein the second neural network layer is adjacent to the first neural network layer.

Clause 19: The neural network circuit of any of the preceding Clauses, wherein the plurality of CIM PEs are configured as pseudo-weight-stationary PEs.

Clause 20: The neural network circuit of any of the preceding Clauses, wherein the plurality of CIM PEs are configured as digital compute-in-memory (DCIM) PEs.

Clause 21: The neural network circuit of any of the preceding Clauses, wherein the plurality of NPU PEs are configured as output-stationary PEs.

Clause 22: The neural network circuit of any of the preceding Clauses, further comprising bus arbitration logic coupled between the bus and the plurality of CIM PEs and between the bus and the plurality of NPU PEs.

Clause 23: The neural network circuit of Clause 22, further comprising a digital processing circuit coupled between the bus arbitration logic and the plurality of CIM PEs and between the bus arbitration logic and the plurality of NPU PEs.

Clause 24: The neural network circuit of Clause 23, further comprising: a first first-in, first-out (FIFO) circuit coupled between the digital processing circuit and the plurality of CIM PEs; and a second FIFO circuit coupled between the digital processing circuit and the plurality of NPU PEs.

Clause 25: The neural network circuit of Clause 22, further comprising: a first first-in, first-out (FIFO) circuit coupled between the bus arbitration logic and the plurality of CIM PEs; and a second FIFO circuit coupled between the bus arbitration logic and the plurality of NPU PEs.

Clause 26: A method for neural network processing, comprising: processing data in a neural network circuit comprising a plurality of compute-in-memory (CIM) processing elements (PEs), a plurality of neural processing unit (NPU) PEs, and a bus coupled to the plurality of CIM PEs and to the plurality of NPU PEs; and transferring the processed data between at least one of the plurality of CIM PEs and at least one of the plurality of NPU PEs via the bus.

Clause 27: The method of Clause 26, wherein the neural network circuit further comprises at least one of a global memory or a tightly coupled memory (TCM) and wherein the transferring comprises transferring the processed data between the at least one of the plurality of CIM PEs and the at least one of the plurality of NPU PEs via the bus without writing the processed data to the at least one of the global memory or the TCM.

Clause 28: The method of Clause 26 or 27, further comprising digitally post-processing the processed data in a digital processing circuit before transferring the processed data via the bus.

Clause 29: The method of any of Clauses 26-28, wherein the plurality of CIM PEs are configured as pseudo-weight-stationary PEs and wherein the plurality of NPU PEs are configured as output-stationary PEs.

Clause 30: A processing system comprising: a plurality of compute-in-memory (CIM) processing elements (PEs); a plurality of neural processing unit (NPU) PEs; a bus coupled to the plurality of CIM PEs and to the plurality of NPU PEs; a memory having computer-executable instructions stored thereon; and one or more processors configured to execute the computer-executable instructions stored thereon to transfer processed data between at least one of the plurality of CIM PEs and at least one of the plurality of NPU PEs via the bus.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed:

1. A neural-network-processing circuit comprising:

a plurality of compute-in-memory (CIM) processing elements (PEs);

a plurality of neural processing unit (NPU) PEs;

a bus coupled to the plurality of CIM PEs and to the plurality of NPU PEs;

a global memory, wherein at least one of the plurality of CIM PEs is configured to transfer data to or receive data from at least one of the plurality of NPU PEs without the data being written to or being read from the global memory;

bus arbitration logic coupled between the bus and the plurality of CIM PEs and between the bus and the plurality of NPU PEs;

a first first-in, first-out (FIFO) circuit coupled between the bus arbitration logic and the plurality of CIM PEs; and a second FIFO circuit coupled between the bus arbitration logic and the plurality of NPU PEs.

2. The neural-network-processing circuit of claim 1, wherein the at least one of the plurality of CIM PEs is in a same neural network layer as the at least one of the plurality of NPU PEs.

3. The neural-network-processing circuit of claim 1, wherein the at least one of the plurality of CIM PEs is in a first neural network layer and wherein the at least one of the plurality of NPU PEs is in a second neural network layer, different from the first neural network layer.

4. The neural-network-processing circuit of claim 3, wherein the second neural network layer is adjacent to the first neural network layer.

5. The neural-network-processing circuit of claim 1, wherein the plurality of CIM PEs are configured as pseudo-weight-stationary PEs.

6. The neural-network-processing circuit of claim 1, wherein the plurality of CIM PEs are configured as digital compute-in-memory (DCIM) PEs.

7. The neural-network-processing circuit of claim 1, wherein the plurality of NPU PEs are configured as output-stationary PEs.

8. The neural-network-processing circuit of claim 1, further comprising a digital processing circuit coupled between the bus arbitration logic and the plurality of CIM PEs and between the bus arbitration logic and the plurality of NPU PEs.

9. A neural-network-processing circuit comprising:

a plurality of compute-in-memory (CIM) processing elements (PEs);

a plurality of neural processing unit (NPU) PEs;

a bus coupled to the plurality of CIM PEs and to the plurality of NPU PES;

a global memory, wherein at least one of the plurality of CIM PEs is configured to transfer data to or receive data from at least one of the plurality of NPU PEs without the data being written to or being read from the global memory;

bus arbitration logic coupled between the bus and the plurality of CIM PEs and between the bus and the plurality of NPU PEs;

a digital processing circuit coupled between the bus arbitration logic and the plurality of CIM PEs and between the bus arbitration logic and the plurality of NPU PEs;

a first first-in, first-out (FIFO) circuit coupled between the digital processing circuit and the plurality of CIM PEs; and a second FIFO circuit coupled between the digital processing circuit and the plurality of NPU PEs.

* * * * *